United States Patent
Mitobe et al.

(10) Patent No.: US 12,124,061 B2
(45) Date of Patent: Oct. 22, 2024

(54) METHOD OF FORMING PHOTO-ALIGNMENT FILM AND METHOD OF FORMING LIQUID CRYSTAL LAYER

(71) Applicant: FUJIFILM Corporation, Tokyo (JP)

(72) Inventors: Fumitake Mitobe, Minamiashigara (JP); Yukito Saitoh, Minamiashigara (JP); Hiroshi Sato, Minamiashigara (JP); Katsumi Sasata, Minamiashigara (JP); Akiko Watano, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 341 days.

(21) Appl. No.: 17/702,010

(22) Filed: Mar. 23, 2022

(65) Prior Publication Data

US 2022/0221630 A1 Jul. 14, 2022

Related U.S. Application Data

(63) Continuation of application No. PCT/JP2020/036297, filed on Sep. 25, 2020.

(30) Foreign Application Priority Data

Sep. 27, 2019 (JP) ................. 2019-176947

(51) Int. Cl.
*G02B 5/18* (2006.01)
*G02B 5/30* (2006.01)

(52) U.S. Cl.
CPC ......... *G02B 5/1857* (2013.01); *G02B 5/3016* (2013.01)

(58) Field of Classification Search
CPC ............................ G02B 5/1857; G02B 5/3016
See application file for complete search history.

(56) References Cited

U.S. PATENT DOCUMENTS

| | | | |
|---|---|---|---|
| 2017/0090289 A1 | 3/2017 | Yajima | |
| 2020/0326579 A1 | 10/2020 | Sato et al. | |
| 2020/0348545 A1 | 11/2020 | Sato et al. | |

FOREIGN PATENT DOCUMENTS

| | | |
|---|---|---|
| JP | 2002-198301 A | 7/2002 |
| JP | 2017-62348 A | 3/2017 |

(Continued)

OTHER PUBLICATIONS

Japanese Office Action for corresponding Japanese Application No. 2021-549048, dated May 9, 2023, with English translation.

(Continued)

*Primary Examiner* — Nicole M Ippolito
*Assistant Examiner* — Hanway Chang
(74) *Attorney, Agent, or Firm* — Birch, Stewart, Kolasch & Birch, LLP

(57) ABSTRACT

Provided are a method of forming a photo-alignment film having a large size that can appropriately align a liquid crystal compound can be formed and a method of forming a liquid crystal layer having a large size in which alignment defects of a liquid crystal compound can be suppressed. The method of forming a photo-alignment film includes: an exposure step of irradiating a surface of a photo-alignment film including a photo-alignment material that is formed on a support with interference light formed by intersection of two light components such that the surface of the photo-alignment film is exposed to form, on the photo-alignment film, an alignment pattern in which a direction of an optical axis derived from a liquid crystal compound changes while continuously rotating in at least one in-plane direction; and a moving step of moving the support by a distance D in a direction parallel to the surface of the support and parallel to a straight line formed by optical axes of the two beams, in which the photo-alignment film is exposed by alternately (Continued)

repeating the exposure step and the moving step. Here, the distance D is represented by $\lambda/\{2\times\sin(\alpha/2)\}\times N-\lambda/8 < D < \lambda/\{2\times\sin(\alpha/2)\}\times N+\lambda/8$.

20 Claims, 6 Drawing Sheets

(56) References Cited

FOREIGN PATENT DOCUMENTS

| JP | 2018-159848 A | 10/2018 |
|----|---------------|---------|
| WO | WO 98/20391 A1 | 5/1998 |
| WO | WO 2019/131918 A1 | 7/2019 |
| WO | WO 2019/131966 A1 | 7/2019 |

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/036297, dated Apr. 7, 2022, with an English translation.

International Search Report (Form PCT/ISA/210) for International Application No. PCT/JP2020/036297, dated Dec. 8, 2020, with an English translation.

Japanese Office Action for corresponding Japanese Application No. 2021-549048, dated Aug. 1, 2023, with English translation.

Japanese Office Action for corresponding Japanese Application No. 2021-549048 dated Oct. 3, 2023, with English translation.

METHOD OF FORMING PHOTO-ALIGNMENT FILM AND METHOD OF FORMING LIQUID CRYSTAL LAYER

CROSS-REFERENCE TO RELATED APPLICATIONS

This application is a Continuation of PCT International Application No. PCT/JP2020/036297 filed on Sep. 25, 2020, which claims priority under 35 U.S.C. § 119(a) to Japanese Patent Application No. 2019-176947 filed on Sep. 27, 2019. The above application is hereby expressly incorporated by reference, in its entirety, into the present application.

BACKGROUND OF THE INVENTION

1. Field of the Invention

The present invention relates to a method of forming a photo-alignment film and a method of forming a liquid crystal element.

2. Description of the Related Art

An optical element including a liquid crystal layer that is formed of a liquid crystal composition including a liquid crystal compound is used as various optical elements such as a diffraction element or an optically-anisotropic layer.

For example, WO2019/131966A describes an optical element comprising a plurality of cholesteric liquid crystal layers that are laminated, the cholesteric liquid crystal layers being obtained by immobilizing a cholesteric liquid crystalline phase, in which the plurality of cholesteric liquid crystal layers have different selective reflection center wavelengths, the cholesteric liquid crystal layer has a liquid crystal alignment pattern in which a direction of an optical axis derived from a liquid crystal compound changes while continuously rotating in at least one in-plane direction, and in a case where, in the liquid crystal alignment pattern of the cholesteric liquid crystal layer, a length over which the direction of the optical axis derived from the liquid crystal compound rotates by 180° in the in-plane direction in which the direction of the optical axis derived from the liquid crystal compound changes while continuously rotating is set as a single period, a permutation of lengths of the selective reflection center wavelengths and a permutation of lengths of the single periods match each other in the plurality of cholesteric liquid crystal layers having different selective reflection center wavelengths.

As a method of forming a photo-alignment film for aligning the liquid crystal compound to the liquid crystal alignment pattern in which the direction of the optical axis derived from the liquid crystal compound changes while continuously rotating in at least one in-plane direction, WO2019/131966A describes a method of exposing a photo-alignment film to interference light to form an alignment pattern where an alignment state changes periodically.

SUMMARY OF THE INVENTION

In the method of forming a photo-alignment film described in WO2019/131966A, the alignment pattern is formed in a region that is exposed to interference light. The irradiation size of the interference light with which the photo-alignment film is irradiated is limited to a diameter of about 10 cm, and a photo-alignment film having a large size cannot be formed.

A method of expanding the irradiation size using a beam expander or the like can be adopted. In a case where the irradiation size expands, the irradiation energy per unit area decreases. Therefore, a high energy laser is required, and existing lasers have a limit on maximum output. In addition, the size of an optical system increases, which causes a problem in that the size of the device increases. Therefore, realistically, an increase in the size of the photo-alignment film using the method of expanding the irradiation size is limited to several centimeters.

Therefore, the present inventors investigated a method of forming a photo-alignment film using a method of moving the position of a support such that interference exposure is performed at a plurality of positions. However, it was found that, in a region where the exposure is repeated, a portion where the liquid crystal compound in the liquid crystal layer formed on the photo-alignment film is not appropriately aligned is present such that alignment defects occur.

An object of the present invention is to solve the above-described problem of the related art and to provide: a method of forming a photo-alignment film having a large size that can appropriately align a liquid crystal compound can be formed; and a method of forming a liquid crystal layer having a large size in which alignment defects of a liquid crystal compound can be suppressed.

In order to achieve the object, the present invention has the following configurations.

[1] A method of forming a photo-alignment film, the method comprising:
an exposure step of irradiating a surface of a photo-alignment film including a photo-alignment material that is formed on a support with interference light formed by intersection of two beams such that the surface of the photo-alignment film is exposed to form, on the photo-alignment film, an alignment pattern in which a direction of an optical axis derived from a liquid crystal compound changes while continuously rotating in at least one in-plane direction; and
a moving step of moving the support by a distance D in a direction parallel to the surface of the support and parallel to a straight line formed by optical axes of the two beams,
in which the photo-alignment film is exposed by alternately repeating the exposure step and the moving step,
in a case where a wavelength of the two beams is represented by $\lambda$, an intersecting angle between the two beams is represented by $\alpha$, and N represents an integer, the distance D is represented by the following expression and is less than an irradiation size of the interference light with which the photo-alignment film is irradiated.

$$\lambda/\{2 \times \sin(\alpha/2)\} \times N - \lambda/8 < D < \lambda/\{2 \times \sin(\alpha/2)\} \times N + \lambda/8$$

[2] The method of forming a photo-alignment film according to [1],
in which the two beams are branched from output light from one light source, and
in the moving step, the output light is shielded by a shutter that shields the output light.
[3] The method of forming a photo-alignment film according to [1] or [2],
in which an irradiation shape of the interference light is formed by a mask.
[4] The method of forming a photo-alignment film according to any one of [1] to [3], in which in the single the exposure step, the irradiation of the photo-alignment film with the interference light is performed for 3 minutes or longer.

[5] The method of forming a photo-alignment film according to any one of [1] to [4],
in which in the exposure step, the irradiation size of the interference light with which the photo-alignment film is irradiated is 50 mm or less.

[6] The method of forming a photo-alignment film according to any one of [1] to [5],
in which the distance D in the moving step is 5 mm to 50 mm.

[7] The method of forming a photo-alignment film according to any one of [1] to [6], further comprising a step of moving the support in a direction parallel to the surface of the support and perpendicular to the straight line formed by the optical axes of the two beams to expose the surface of the photo-alignment film.

[8] A method of forming a liquid crystal layer comprising:
forming a liquid crystal layer on a photo-alignment film using a liquid crystal composition including a liquid crystal compound, the photo-alignment film being formed using the method of forming a photo-alignment film according to any one of [1] to [7].

According to an aspect of the present invention, it is possible to provide: a method of forming a photo-alignment film having a large size that can appropriately align a liquid crystal compound can be formed; and a method of forming a liquid crystal layer having a large size in which alignment defects of a liquid crystal compound can be suppressed.

DESCRIPTION OF THE PREFERRED EMBODIMENTS

Figure 1:
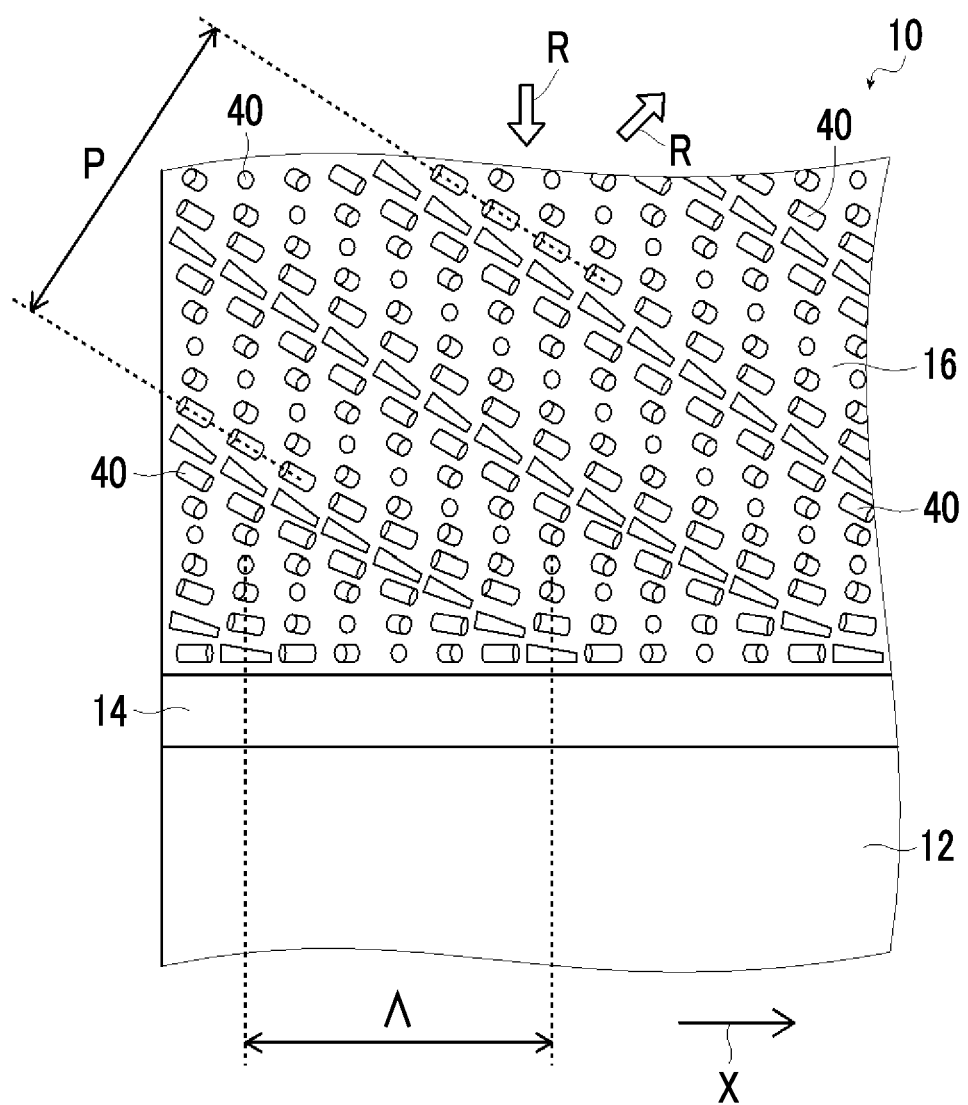
FIG. 1 is a diagram conceptually showing an example of an optical element prepared using a method of forming a photo-alignment film according to the present invention.

Hereinafter, a method of forming a photo-alignment film and a method of forming a liquid crystal layer according to the present invention will be described in detail based on a preferred embodiment shown in the accompanying drawings.

In the present invention, numerical ranges represented by "to" include numerical values before and after "to" as lower limit values and upper limit values.

In this present invention, "(meth)acrylate" represents "either or both of acrylate and methacrylate".

In the present invention, $Re(\lambda)$ represents an in-plane retardation at a wavelength $\lambda$. Unless specified otherwise, the wavelength $\lambda$ refers to 550 nm.

In the present invention, $Re(\lambda)$ is a value measured at the wavelength $\lambda$ using a polarization phase difference analysis device AxoScan (manufactured by Axometrics, Inc.). By inputting an average refractive index $((nx+ny+nz)/3)$ and a thickness (d (μm)) to AxoScan, the following expressions can be calculated.

Slow Axis Direction (°)

$$Re(\lambda)=R0(\lambda)$$

R0(2) is expressed as a numerical value calculated by AxoScan and represents $Re(\lambda)$.

In this present invention, the refractive indices nx, ny, and nz are measured using an Abbe refractometer (NAR-4T, manufactured by Atago Co., Ltd.), and a sodium lamp (2=589 nm) is used as a light source. In addition, the wavelength dependence can be measured using a combination of a multi-wavelength Abbe refractometer DR-M2 (manufactured by Atago Co., Ltd.) and an interference filter.

In addition, as the refractive index, values described in "Polymer Handbook" (John Wiley&Sons, Inc.) and catalogs of various optical films can also be used. The values of average refractive index of major optical films are as follows: cellulose acylate (1.48), cycloolefin polymer (1.52), polycarbonate (1.59), polymethyl methacrylate (1.49), and polystyrene (1.59).

[Optical Element]

First, an optical element that is prepared using the method of forming a photo-alignment film and the method of forming a liquid crystal layer according to the embodiment of the present invention (hereinafter, also collectively referred to as the forming method according to the embodiment of the present invention) will be described using the drawings.

FIG. 1 is a diagram conceptually showing an example of the optical element prepared using the forming method according to the present invention.

An optical element 10 shown in FIG. 1 includes a support 12, a photo-alignment film 14, and a cholesteric liquid crystal layer 16.

The cholesteric liquid crystal layer 16 is obtained by immobilizing a cholesteric liquid crystalline phase. In the present invention, the cholesteric liquid crystal layer 16 has a liquid crystal alignment pattern in which a direction of an optical axis 40A derived from a liquid crystal compound 40 changes while continuously rotating in at least one in-plane direction (refer to FIG. 2).

Figure 3:
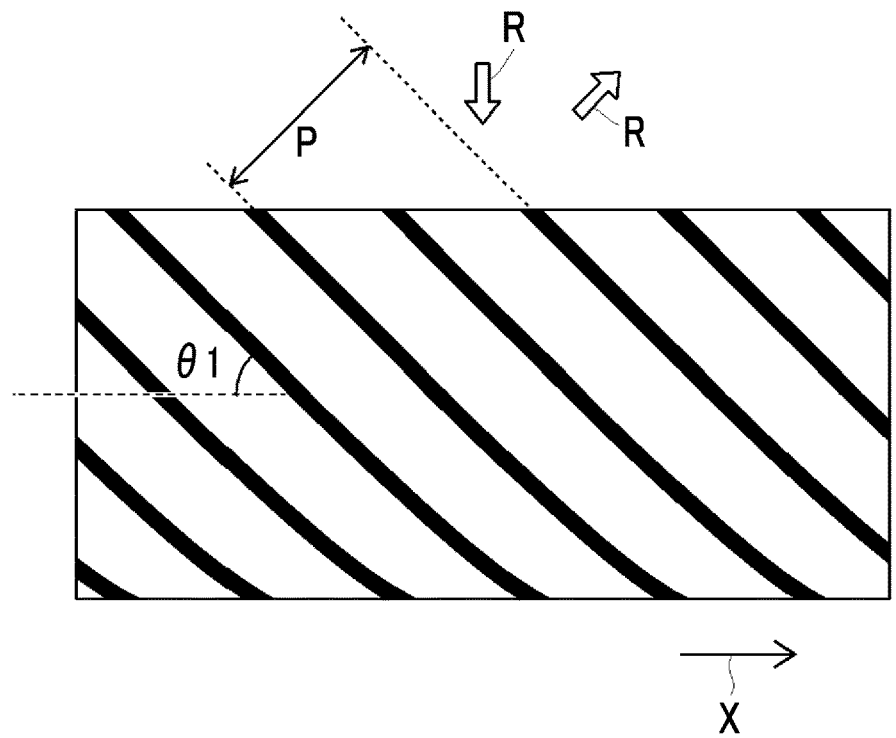
FIG. 3 is a diagram conceptually showing a cross-sectional SEM image of the cholesteric liquid crystal layer shown in FIG. 1.

In addition, in a cross-section of the cholesteric liquid crystal layer 16 observed with a scanning electron microscope (SEM), bright portions and dark portions derived from a cholesteric liquid crystalline phase are tilted with respect to a main surface (refer to FIG. 3). The main surface is the maximum surface of a sheet-shaped material (for example, a film or a plate-shaped material).

<Support>

In the optical element 10, the support 12 supports the photo-alignment film 14 and the cholesteric liquid crystal layer 16.

As the support 12, various sheet-shaped materials can be used as long as they can support the photo-alignment film 14 and the cholesteric liquid crystal layer 16.

A transmittance of the support 12 with respect to corresponding light is preferably 50% or higher, more preferably 70% or higher, and still more preferably 85% or higher.

The thickness of the support 12 is not particularly limited and may be appropriately set depending on the use of the optical element 10, flexibility or rigidity required for the optical element 10, a difference in thickness required for the optical element 10, and a material for forming the support 12, and the like in a range where the photo-alignment film 14 and the cholesteric liquid crystal layer 16 can be supported.

The thickness of the support 12 is preferably 1 to 1000 µm, more preferably 3 to 250 µm, and still more preferably 5 to 150 µm.

The support 12 may have a monolayer structure or a multi-layer structure.

In a case where the support 12 has a monolayer structure, examples thereof include supports 12 formed of glass, triacetyl cellulose (TAC), polyethylene terephthalate (PET), polycarbonates, polyvinyl chloride, acryl, polyolefin, and the like. In a case where the support 12 has a multi-layer structure, examples thereof include a support including: one of the above-described supports having a monolayer structure that is provided as a substrate; and another layer that is provided on a surface of the substrate.

<Photo-Alignment Film>

In the optical element 10, the photo-alignment film 14 is formed on a surface of the support 12.

The photo-alignment film 14 is an alignment film for aligning the liquid crystal compound 40 to a predetermined liquid crystal alignment pattern during the formation of the cholesteric liquid crystal layer 16.

Although described below, the cholesteric liquid crystal layer 16 has the liquid crystal alignment pattern in which the direction of the optical axis 40A (refer to FIG. 2) derived from the liquid crystal compound 40 changes while continuously rotating in one in-plane direction. Accordingly, the photo-alignment film 14 is formed such that the cholesteric liquid crystal layer 16 can form the liquid crystal alignment pattern.

In the following description, "the direction of the optical axis 40A rotates" will also be simply referred to as "the optical axis 40A rotates".

The photo-alignment film 14 is a so-called a photo-alignment film obtained by irradiating (exposing) a photo-alignment material with light. That is, the photo-alignment film 14 is a photo-alignment film that is formed by applying a photo-alignment material to the support 12 and exposing the applied photo-alignment material.

Preferable examples of the photo-alignment material used in the photo-alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitability used.

The thickness of the photo-alignment film 14 is not particularly limited. The thickness with which a required alignment function can be obtained may be appropriately set depending on the material for forming the photo-alignment film 14.

The thickness of the photo-alignment film 14 is preferably 0.01 to 5 µm and more preferably 0.05 to 2 µm.

The method of forming the photo-alignment film 14 will be described in detail.

<Cholesteric Liquid Crystal Layer>

In the optical element 10, the cholesteric liquid crystal layer 16 is formed on a surface of the photo-alignment film 14.

The cholesteric liquid crystal layer 16 is obtained by immobilizing a cholesteric liquid crystalline phase. That is, the cholesteric liquid crystal layer 16 is a layer formed of the liquid crystal compound 40 (liquid crystal material) having a cholesteric structure.

The cholesteric liquid crystal layer has a helical structure in which the liquid crystal compound 40 is helically turned and laminated obtained by immobilizing a typical cholesteric liquid crystalline phase. In the helical structure, a configuration in which the liquid crystal compound 40 is helically turned once (rotated by 360) and laminated is set as one helical pitch, and plural pitches of the helically turned liquid crystal compound 40 are laminated. That is, one helical pitch is a pitch P shown in FIG. 1.

In other words, one helical pitch refers to the length of one helical winding, that is, the length in a helical axis direction in which a director (in a rod-like liquid crystal, a major axis direction) of the liquid crystal compound constituting the cholesteric liquid crystalline phase rotates by 360°.

Here, in a cross-section of the cholesteric liquid crystal layer observed with a SEM, a stripe pattern including bright portions (bright lines) and dark portions (dark lines) derived from the cholesteric liquid crystalline phase is observed. That is, in the cross-section of the cholesteric liquid crystal layer, a layered structure in which the bright portions and the dark portions are alternately laminated in the thickness direction is observed.

In the cholesteric liquid crystalline phase, a structure in which the bright portion and the dark portion are repeated twice corresponds to one helical pitch. The structure in which the bright portion B and the dark portion D are repeated twice includes three dark portions (bright portions) and two bright portions (dark portions) (refer to FIG. 3). Therefore, one helical pitch (pitch P) of the cholesteric liquid crystal layer, that is, the reflective layer can be measured from a SEM cross-sectional view.

<<Cholesteric Liquid Crystalline Phase>>

It is known that the cholesteric liquid crystalline phase exhibits selective reflectivity at a specific wavelength.

A center wavelength of selective reflection (selective reflection center wavelength) λ of a general cholesteric liquid crystalline phase depends on the length (pitch P, refer to FIGS. 1 and 3) of one helical pitch in the cholesteric liquid crystalline phase and satisfies a relationship of λ=n×P with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), p. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

The cholesteric liquid crystal layer 16 shown in FIG. 1 has a right helical twisted direction, and thus reflects right circularly polarized light in a selective wavelength range.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width Δλ (nm) of a selective reflection wavelength range (circularly polarized light reflection wavelength range) where selective reflection is exhibited depends on Δn of the cholesteric liquid crystalline phase and the helical pitch P and complies with a relationship of Δλ=Δn×P. Therefore, the width of the selective reflection wavelength range can be controlled by adjusting Δn. Δn can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical laminate and may be, for example, 10 to 500 nm and is preferably 20 to 300 nm and more preferably 30 to 100 nm.

<<Liquid Crystal Alignment Pattern of Cholesteric Liquid Crystal Layer>>

The cholesteric liquid crystal layer 16 has the liquid crystal alignment pattern in which the direction of the optical axis 40A derived from the liquid crystal compound 40 forming the cholesteric liquid crystalline phase changes while continuously rotating in the one in-plane direction of the cholesteric liquid crystal layer.

The optical axis 40A derived from the liquid crystal compound 40 is an axis having the highest refractive index in the liquid crystal compound 40, that is, a so-called slow axis. For example, in a case where the liquid crystal compound 40 is a rod-like liquid crystal compound, the optical axis 40A is along a rod-like major axis direction. In the following description, the optical axis 40A derived from the liquid crystal compound 40 will also be referred to as "the optical axis 40A of the liquid crystal compound 40" or "the optical axis 40A".

Figure 2:
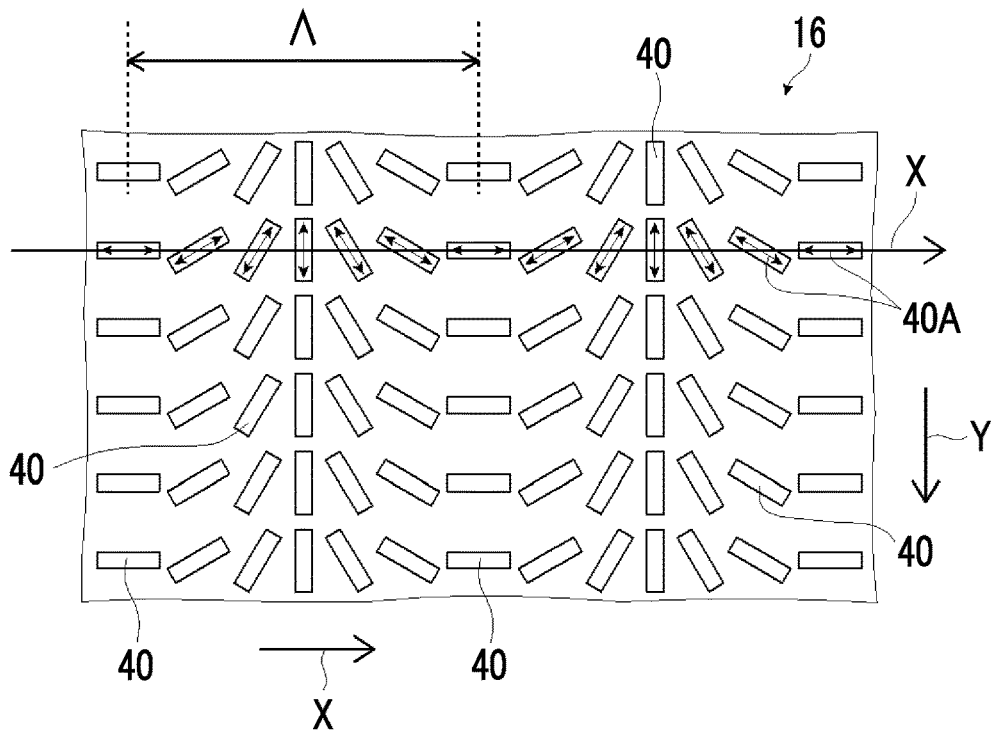
FIG. 2 is a plan view showing a cholesteric liquid crystal layer shown in FIG. 1.

FIG. 2 conceptually shows a plan view of the cholesteric liquid crystal layer 16.

The plan view is a view in a case where the cholesteric liquid crystal layer 16 (optical element 10) is seen from the top in FIG. 1, that is, a view in a case where the optical element 10 is seen from a thickness direction (laminating direction of the respective layers (films)).

In addition, in FIG. 2, in order to clarify the configuration of the cholesteric liquid crystal layer 16 according to the embodiment of the present invention, only the liquid crystal compound 40 on the surface of the photo-alignment film 14 is shown.

As shown in FIG. 2, on the surface of the photo-alignment film 14, the liquid crystal compound 40 forming the cholesteric liquid crystal layer 16 is two-dimensionally arranged according to the alignment pattern formed on the photo-alignment film 14 as the lower layer in a predetermined in-plane direction indicated by arrow X and a direction perpendicular to the one in-plane direction (arrow X direction).

In the following description, the direction perpendicular to the arrow X direction will be referred to as "Y direction" for convenience of description. That is, in FIGS. 1 and 2 and FIG. 4 described below, the Y direction is a direction perpendicular to the paper plane.

In addition, the liquid crystal compound 40 forming the cholesteric liquid crystal layer 16 has the liquid crystal alignment pattern in which the direction of the optical axis 40A changes while continuously rotating in the arrow X direction in a plane of the cholesteric liquid crystal layer 16. In the example shown in the drawing, the liquid crystal compound 40 has the liquid crystal alignment pattern in which the optical axis 40A of the liquid crystal compound 40 changes while continuously rotating counterclockwise in the arrow X direction.

Specifically, "the direction of the optical axis 40A of the liquid crystal compound 40 changes while continuously rotating in the arrow X direction (the predetermined one in-plane direction)" represents that an angle between the optical axis 40A of the liquid crystal compound 40, which is arranged in the arrow X direction, and the arrow X direction varies depending on positions in the arrow X direction, and the angle between the optical axis 40A and the arrow X direction sequentially changes from θ to θ+180° or θ−180° in the arrow X direction.

A difference between the angles of the optical axes 40A of the liquid crystal compound 40 adjacent to each other in the arrow X direction is preferably 45° or less, more preferably 15° or less, and still more preferably less than 15°.

On the other hand, in the liquid crystal compound 40 forming the cholesteric liquid crystal layer 16, the directions of the optical axes 40A are the same in the Y direction perpendicular to the arrow X direction, that is, the Y direction perpendicular to the one in-plane direction in which the optical axis 40A continuously rotates.

In other words, in the liquid crystal compound 40 forming the cholesteric liquid crystal layer 16, angles between the optical axes 40A of the liquid crystal compound 40 and the arrow X direction are the same in the Y direction.

In the optical element 10, in the liquid crystal alignment pattern of the liquid crystal compound 40, the length (distance) over which the optical axis 40A of the liquid crystal compound 40 rotates by 180° in the arrow X direction in which the optical axis 40A changes while continuously rotating in a plane is the length A of the single period in the liquid crystal alignment pattern. That is, a distance between centers of two liquid crystal compounds 40 in the arrow X direction is the length A of the single period, the two liquid crystal compounds having the same angle in the arrow X direction.

Specifically, as shown in FIGS. 1 and 2, a distance of centers in the arrow X direction of two liquid crystal compounds 40 in which the arrow X direction and the direction of the optical axis 40A match each other is the length A of the single period. In the following description, the length A of the single period will also be referred to as "single period Λ".

In the optical element 10, in the liquid crystal alignment pattern of the cholesteric liquid crystal layer, the single period Λ is repeated in the arrow X direction, that is, in the one in-plane direction in which the direction of the optical axis 40A changes while continuously rotating.

The cholesteric liquid crystal layer obtained by immobilizing a cholesteric liquid crystalline phase typically reflects incident light (circularly polarized light) by specular reflection.

On the other hand, the cholesteric liquid crystal layer 16 reflects incidence light in a direction having an angle in the arrow X direction with respect to the incidence light. The cholesteric liquid crystal layer 16 has the liquid crystal alignment pattern in which the optical axis 40A changes while continuously rotating in the arrow X direction in a plane (the predetermined one in-plane direction).

The cholesteric liquid crystal layer 16 shown in FIG. 1 reflects right circularly polarized light R in a selective wavelength range.

Accordingly, in a case where light is incident into the cholesteric liquid crystal layer 16, the cholesteric liquid crystal layer 16 reflects only right circularly polarized light R in the selective wavelength range and allows transmission of the other light.

A typical cholesteric liquid crystal layer not having the liquid crystal alignment pattern in a plane reflects incident circularly polarized light by specular reflection.

On the other hand, the cholesteric liquid crystal layer 16 that has the liquid crystal alignment pattern in which the optical axis 40A changes while continuously rotating in the arrow X direction in a plane reflects incident circularly polarized light in a direction tilted in the arrow X direction with respect to specular reflection.

Hereinafter, this point will be described.

In a case where the right circularly polarized light R incident into the cholesteric liquid crystal layer 16 is reflected from the cholesteric liquid crystal layer, the absolute phase changes depending on the directions of the optical axes 40A of the respective liquid crystal compounds 40.

Here, in the cholesteric liquid crystal layer 16, the optical axis 40A of the liquid crystal compound 40 changes while rotating in the arrow X direction (the one in-plane direction). Therefore, the amount of change in the absolute phase of the incident right circularly polarized light R varies depending on the direction of the optical axis 40A.

Further, the liquid crystal alignment pattern formed in the cholesteric liquid crystal layer 16 is a pattern that is periodic in the arrow X direction. Therefore, an absolute phase that is periodic in the arrow X direction corresponding to the direction of each of the optical axes 40A is assigned to the right circularly polarized light R incident into the cholesteric liquid crystal layer 16.

In addition, the direction of the optical axis 40A of the liquid crystal compound 40 with respect to the arrow X direction is uniform in the arrangement of the liquid crystal compound 40 in the Y direction perpendicular to arrow X direction.

As a result, in the cholesteric liquid crystal layer 16, an equiphase surface that is tilted to fall in the arrow X direction with respect to an XY plane is formed for the right circularly polarized light R. The equiphase surface is formed to connect the liquid crystal compounds 40 that are helically turned and in which the directions of the optical axes 40A match with each other in the turning direction.

In the cholesteric liquid crystal layer 16, the equiphase surface functions as a reflecting surface.

In a cross-section of the cholesteric liquid crystalline phase observed with a SEM, a stripe pattern including bright portions and dark portions derived from the cholesteric liquid crystalline phase is observed.

As is well known, the bright portions and the dark portions of the cholesteric liquid crystalline phase are formed to connect the liquid crystal compounds 40 that are helically turned and in which the directions of the optical axes 40A match with each other in the turning direction. That is, the bright portions and the dark portions match with the above-described equiphase surface.

Here, bright portions and dark portions of a typical cholesteric liquid crystal layer are parallel to the main surface, that is, the alignment surface that is the formation surface.

On the other hand, the cholesteric liquid crystal layer 16 has the liquid crystal alignment pattern in which the optical axis 40A changes while continuously rotating in the arrow X direction in a plane. Accordingly, as conceptually shown in FIG. 3, bright portions and dark portions D of the cholesteric liquid crystal layer 16 are tilted to fall in the arrow X direction with respect to the main surface, that is, the photo-alignment film 14 according to the arrangement of the liquid crystal compounds 40 in which the directions of the optical axes 40A match with each other in the helical turning.

Therefore, the incident right circularly polarized light R are reflected in the normal direction of the bright portions B and the dark portions D, that is, the equiphase surface and are reflected in a direction tilted in the arrow X direction with respect to the XY plane (main surface of the cholesteric liquid crystal layer).

By reversing the rotation direction of the optical axis 40A of the liquid crystal compound 40 toward the arrow X direction, a reflection direction of the right circularly polarized light R can be reversed. That is, in FIGS. 1 and 2, the rotation direction of the optical axis 40A toward the arrow X direction is counterclockwise, and the right circularly polarized light R is reflected in a state where it is tilted in the arrow X direction. By setting the rotation direction of the optical axis 40A to be clockwise, the tilt direction of the bright portions B and the dark portions D is reversed, and the right circularly polarized light R is reflected in a state where it is tilted in a direction opposite to the arrow X direction. In other words, this aspect is the same as a case where the arrow X direction in which the optical axis 40A rotates counterclockwise is reversed.

Further, as described above, in the cholesteric liquid crystal layer 16 that reflects right circularly polarized light and the cholesteric liquid crystal layer that reflects left circularly polarized light, the helical turning directions of the liquid crystal compounds 40 are opposite to each other. Accordingly, in the cholesteric liquid crystal layer that reflects left circularly polarized light and have the liquid crystal alignment pattern in which the optical axis 40A rotates counterclockwise in the arrow X direction as in the example shown in the drawing, the tilt direction of the bright portions B and the dark portions D is opposite, and thus the left circularly polarized light is reflected toward a direction opposite to the arrow X direction.

In the cholesteric liquid crystal layer 16, as the single period Λ of the liquid crystal alignment pattern in which the optical axis 40A continuously rotates in a plane decreases, the above-described tilt angle of reflected light with respect to incidence light increases. That is, as the single period Λ decreases, reflected light can be reflected in a state where it is largely tilted with respect to the incidence direction.

Accordingly, in the cholesteric liquid crystal layer 16, the reflection angle of reflected light of incident light can be adjusted by adjusting the single period Λ.

The single period Λ of the liquid crystal alignment pattern is not particularly limited. From the viewpoint that reflected light can be reflected in a state where it is largely tilted with respect to the incidence direction, the single period Λ of the liquid crystal alignment pattern is preferably 1.6 μm or less, more preferably 1.0 μm or less, and still more preferably 0.6 μm or less.

In addition, in the cholesteric liquid crystal layer 16 shown in FIG. 2, the liquid crystal compound 40 is tilted with respect to the main surface and the tilt direction substantially matches with the bright lines and the dark lines of the cholesteric liquid crystalline phase, and bright portions and dark portions corresponding to a reflecting surface match with the liquid crystal compound 40. Therefore, in the cholesteric liquid crystal layer 16, the action of the liquid crystal compound 40 on light reflection (diffraction) increases, the diffraction efficiency can be improved. As a result, for example, the amount of reflected light with respect to incidence light can be further improved as compared to the related art.

In the example shown in FIG. 2, the tilt of the liquid crystal compound 40 and the tilt of the bright lines and the dark lines of the cholesteric liquid crystalline phase substantially match with each other, but the present invention is not limited thereto. For example, the liquid crystal compound 40 may not be tilted, that is, may be parallel to the main surface of the cholesteric liquid crystal layer.

Here, in the example shown in FIG. 1, the liquid crystal layer in the optical element is the cholesteric liquid crystal layer but is not particularly limited. As in the optical element shown in FIG. 9, the liquid crystal layer may be an optically-anisotropic layer not having a helical structure where the liquid crystal compound is helically turned and laminated.

Figure 9:
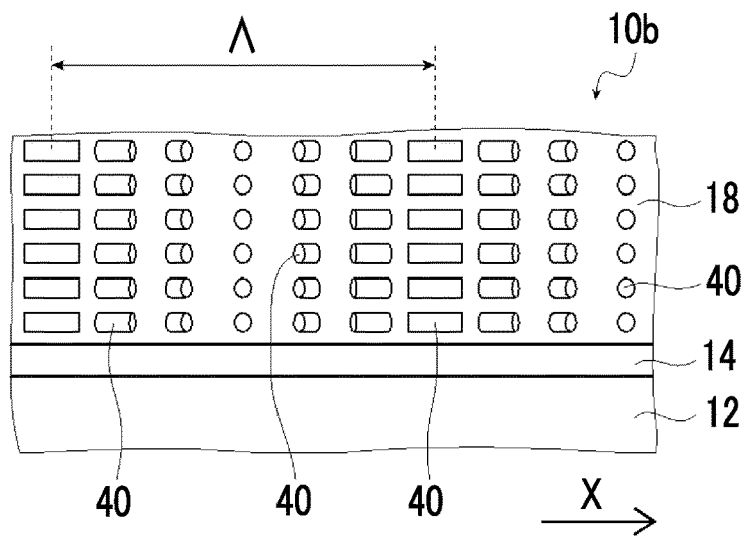
FIG. 9 is a diagram conceptually showing another example of the optical element prepared using the method of forming a photo-alignment film according to the present invention.

An optically-anisotropic layer 18 in an optical element 10b shown in FIG. 9 is a layer formed of a composition including a liquid crystal compound, and has the liquid crystal alignment pattern in which the direction of the optical axis 40A derived from the liquid crystal compound 40 changes while continuously rotating in the one in-plane direction indicated by arrow X in a plane of the optically-anisotropic layer. That is, the plan view of the optically-anisotropic layer 18 shown in FIG. 9 is the same as that of the configuration shown in FIG. 2. The optically-anisotropic layer 18 shown in FIG. 9 has a configuration in which the liquid crystal compounds 40 having the same orientation are laminated in the thickness direction.

As described above, in the liquid crystal compounds arranged in the Y direction in the optically-anisotropic layer 18, the angles between the optical axes 40A and the arrow X direction (the one in-plane direction in which the direction of the optical axis of the liquid crystal compound 40 rotates) are the same. Regions where the liquid crystal compounds 40 in which the angles between the optical axes 40A and the arrow X direction are the same are disposed in the Y direction will be referred to as "regions R".

In this case, it is preferable that an in-plane retardation (Re) value of each of the regions R is a half wavelength, that is, $\lambda/2$. The in-plane retardation is calculated from the product of a difference Δn in refractive index generated by refractive index anisotropy of the region R and the thickness of the optically-anisotropic layer 18. Here, the difference in refractive index generated by refractive index anisotropy of the region R in the optically-anisotropic layer 18 is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound.

In a case where circularly polarized light is incident into the above-described optically-anisotropic layer 18, the light is refracted such that the direction of the circularly polarized light is converted.

Figure 10:
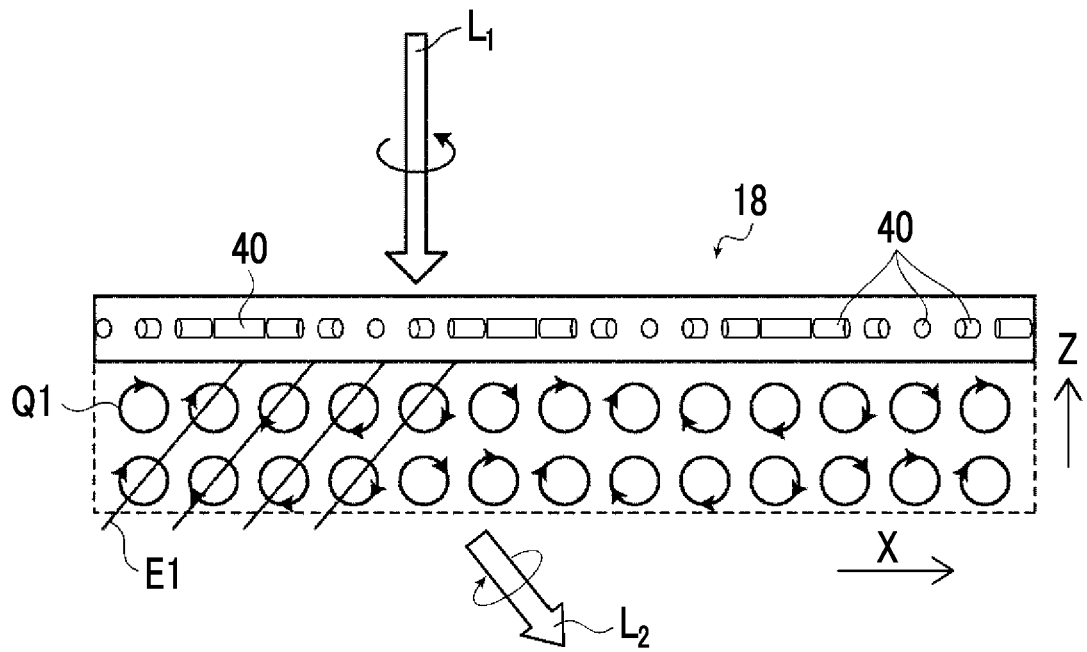
FIG. 10 is a conceptual diagram showing an action of the optical element shown in FIG. 9.

This action is conceptually shown in FIG. 10 using the optically-anisotropic layer 18 as an example. In the optically-anisotropic layer 18, the value of the product of the difference in refractive index of the liquid crystal compound 40 and the thickness of the optically-anisotropic layer 18 is $\lambda/2$.

As shown in FIG. 10, in a case where the value of the product of the difference in refractive index of the liquid crystal compound 40 in the optically-anisotropic layer 18 and the thickness of the optically-anisotropic layer 18 is $\lambda/2$ and incidence light $L_1$ as left circularly polarized light is incident into the optically-anisotropic layer 18, the incidence light $L_1$ transmits through the optically-anisotropic layer 18 to be imparted with a phase difference of 180°, and the transmitted light $L_2$ is converted into right circularly polarized light.

In addition, in a case where the incidence light $L_1$ transmits through the optically-anisotropic layer 18, an absolute phase thereof changes depending on the direction of the optical axis 40A of each of the liquid crystal compounds 40. In this case, the direction of the optical axis 40A changes while rotating in the arrow X direction. Therefore, the amount of change in the absolute phase of the incidence light $L_1$ varies depending on the direction of the optical axis 40A. Further, the liquid crystal alignment pattern that is formed in the optically-anisotropic layer 18 is a pattern that is periodic in the arrow X direction. Therefore, as shown in FIG. 10, the incidence light $L_1$ transmitted through the optically-anisotropic layer 18 is imparted with an absolute phase Q1 that is periodic in the arrow X direction corresponding to the direction of each of the optical axes 40A. As a result, an equiphase surface E1 that is tilted in a direction opposite to the arrow X direction is formed.

Therefore, the transmitted light $L_2$ is refracted to be tilted in a direction perpendicular to the equiphase surface E1 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

Figure 11:
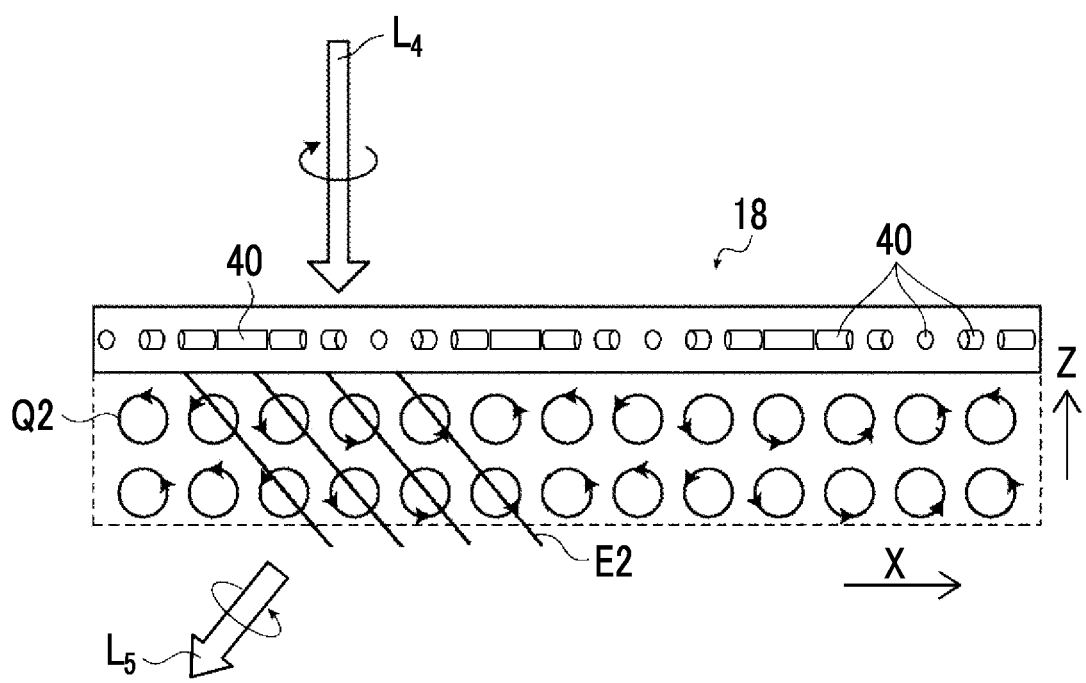
FIG. 11 is a conceptual diagram showing the action of the optical element shown in FIG. 9.

On the other hand, as conceptually shown in FIG. 11, in a case where the value of the product of the difference in refractive index of the liquid crystal compound 40 in the optically-anisotropic layer 18 and the thickness of the optically-anisotropic layer 18 is $\lambda/2$ and incidence light $L_4$ as right circularly polarized light is incident into the optically-anisotropic layer 18, the incidence light $L_4$ transmits through the optically-anisotropic layer 18 to be imparted with a phase difference of 180° and is converted into transmitted light $L_5$ of left circularly polarized light.

In addition, in a case where the incidence light LA transmits through the optically-anisotropic layer 18, an absolute phase thereof changes depending on the direction of the optical axis 40A of each of the liquid crystal compounds 40. In this case, the direction of the optical axis 40A changes while rotating in the arrow X direction. Therefore, the amount of change in the absolute phase of the incidence light $L_4$ varies depending on the direction of the optical axis 40A. Further, the liquid crystal alignment pattern that is formed in the optically-anisotropic layer 18 is a pattern that is periodic in the arrow X direction. Therefore, as shown in FIG. 11, the incidence light $L_4$ transmitted through the optically-anisotropic layer 18 is imparted with an absolute phase Q2 that is periodic in the arrow X direction corresponding to the direction of each of the optical axes 40A.

Here, the incidence light $L_4$ is right circularly polarized light. Therefore, the absolute phase Q2 that is periodic in the arrow X direction corresponding to the direction of the optical axis 40A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

Here, by changing the single period Λ of the liquid crystal alignment pattern formed in the optically-anisotropic layer 18, refraction angles of the transmitted light components $L_2$ and $L_5$ can be adjusted. Specifically, as the single period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, refraction angles of the transmitted light components $L_2$ and $L_5$ with respect to the incidence light components $L_1$ and La vary depending on the wavelengths of the incidence light components $L_1$ and $L_4$ (the transmitted light components $L_2$ and $L_5$). Specifically, as the wavelength of incidence light increases, the transmitted light is largely refracted. That is, in a case where incidence light is red light, green light, and blue light, the red light is refracted to the highest degree, and the blue light is refracted to the lowest degree.

Further, by reversing the rotation direction of the optical axis 40A of the liquid crystal compound 40 that rotates in the arrow X direction, the refraction direction of transmitted light can be reversed.

The optically-anisotropic layer 18 is formed of a cured layer of a liquid crystal composition including a rod-like liquid crystal compound or a disk-like liquid crystal compound, and has a liquid crystal alignment pattern in which an optical axis of the rod-like liquid crystal compound or an optical axis of the disk-like liquid crystal compound is aligned as described above.

By forming the photo-alignment film 14 on the support 12, applying the liquid crystal composition to the photo-alignment film 14, and curing the applied liquid crystal composition, the optically-anisotropic layer 18 consisting of the cured layer of the liquid crystal composition can be obtained. A method of applying the liquid crystal composition and a method of curing the liquid crystal composition are as described above.

Although the optically-anisotropic layer 18 functions as a so-called $\lambda/2$ plate, the present invention includes an aspect where a laminate including the support 12 and the photo-alignment film 14 that are integrated functions as a $\lambda/2$ plate.

In addition, the liquid crystal composition for forming the optically-anisotropic layer 18 includes a rod-like liquid crystal compound or a disk-like liquid crystal compound and may further include other components such as a leveling agent, an alignment control agent, a polymerization initiator, a crosslinking agent, or an alignment assistant. In addition, the liquid crystal composition may include a solvent.

As the rod-like liquid crystal compound, the disk-like liquid crystal compound, or the like in the liquid crystal composition for forming the optically-anisotropic layer 18, the same rod-like liquid crystal compound, the same disk-like liquid crystal compound, or the like as that in the liquid crystal composition for forming the cholesteric liquid crystal layer 16 can be used.

That is, the liquid crystal composition for forming the optically-anisotropic layer 18 is the same as the liquid crystal composition for forming the cholesteric liquid crystal layer 16, except that it includes a chiral agent.

In addition, it is preferable that the optically-anisotropic layer 18 has a wide range for the wavelength of incidence light and is formed of a liquid crystal material having a reverse birefringence index dispersion. In addition, it is also preferable that the optically-anisotropic layer 18 can be made to have a substantially wide range for the wavelength of incidence light by imparting a twist component to the liquid crystal composition or by laminating different retardation layers. For example, in the optically-anisotropic layer 18, a method of realizing a $\lambda/2$ plate having a wide-range pattern by laminating two liquid crystal layers having different twisted directions is disclosed in, for example, JP2014-089476A and can be preferably used in the present invention.

[Method of Forming Photo-Alignment Film]

The method of forming a photo-alignment film according to the embodiment of the present invention comprises:

an exposure step of irradiating a surface of a photo-alignment film including a photo-alignment material that is formed on a support with interference light formed by intersection of two beams such that the surface of the photo-alignment film is exposed to form, on the photo-alignment film, an alignment pattern in which a direction of an optical axis derived from a liquid crystal compound changes while continuously rotating in at least one in-plane direction; and a moving step of moving the support by a distance D in a direction parallel to the surface of the support and parallel to a straight line formed by optical axes of the two beams, in which the photo-alignment film is exposed by alternately repeating the exposure step and the moving step, in a case where a wavelength of the two beams is represented by λ, an intersecting angle between the two beams is represented by a, and N represents an integer, the distance D is represented by the following expression and is less than an irradiation size of the interference light with which the photo-alignment film is irradiated.

$$\lambda/\{2\times\sin(\alpha/2)\}\times N-\lambda/8<D<\lambda/\{2\times\sin(\alpha/2)\}\times N+\lambda/8$$

The method of forming a photo-alignment film according to the embodiment of the present invention includes, for example: an application step of applying a coating liquid for forming a photo-alignment film (hereinafter, also referred to as "coating liquid") to a surface of the support 12; a drying step of drying the applied coating film; and an exposure step of exposing the dried coating film to laser light to form an alignment pattern.

Here, in the method of forming a photo-alignment film according to the embodiment of the present invention, the size of exposed regions increases by performing the exposure multiple times while moving the support 12. That is, the size of the photo-alignment film increases, and the moving distance D during the movement is in the above-described range.

(Application Step)

A method of applying the coating liquid for forming a photo-alignment film is not particularly limited, and various well-known methods used for applying liquid, for example, bar coating, gravure coating, or spray coating can be used. In addition, the coating thickness of the coating liquid (the thickness of the coating film) that is required to obtain a photo-alignment film having a desired thickness may be appropriately set depending on the composition and the like of the coating liquid.

(Drying Step)

A method of drying the coating film is not particularly limited, and all of the well-known drying methods such as heating drying by a heater or heating drying by hot air can be used.

(Exposure Step)

The exposure step is a step of performing interference exposure to a surface of a photo-alignment film including a photo-alignment material to form, on the photo-alignment film, an alignment pattern in which a direction of an optical axis derived from a liquid crystal compound changes while continuously rotating in at least one in-plane direction.

Figure 4:
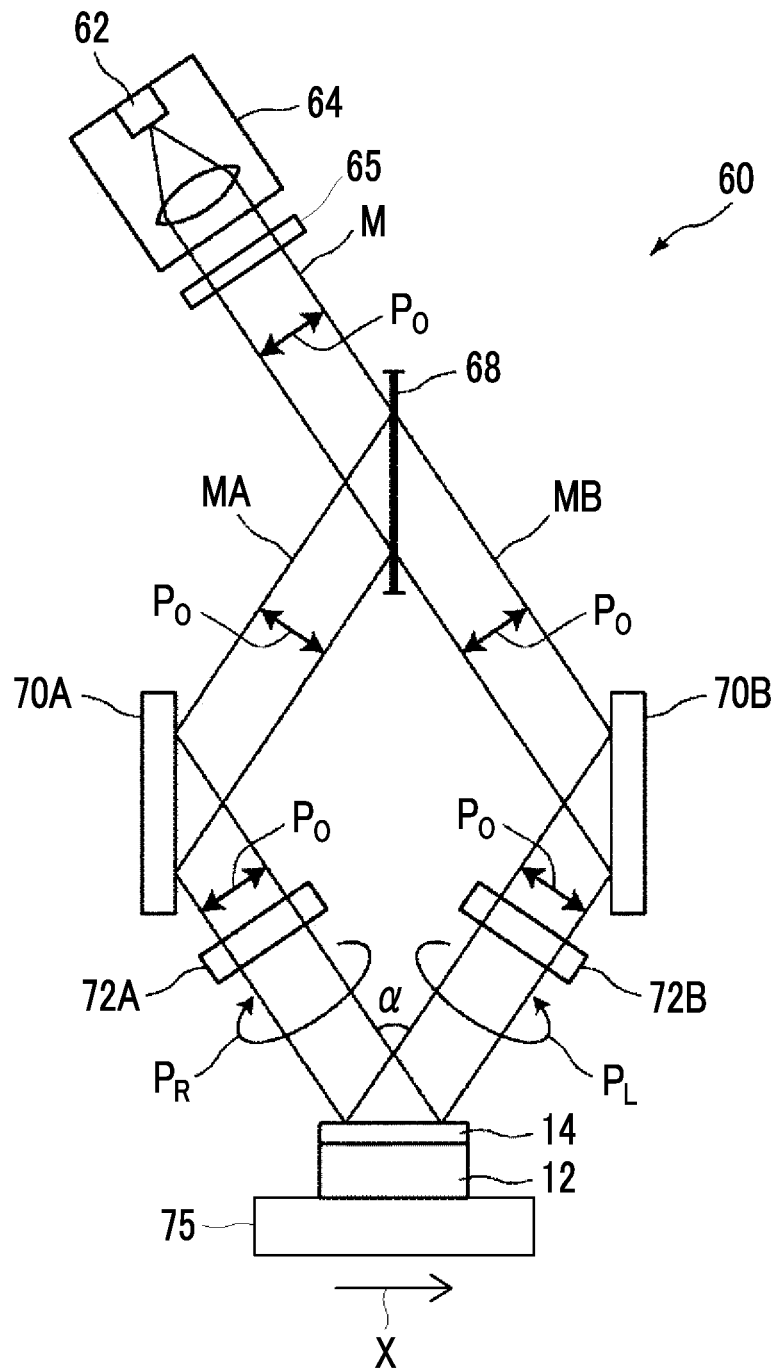
FIG. 4 is a conceptual diagram showing an example of an exposure device that performs the method of forming a photo-alignment film according to the present invention.

FIG. 4 conceptually shows an example of an exposure device that exposes the photo-alignment film 14 to form an alignment pattern.

An exposure device 60 shown in FIG. 4 includes: a light source 64 including a laser 62; an λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the splitted two beams MA and MB; λ/4 plates 72A and 72B; and a movable stage 75.

The light source 64 emits linearly polarized light $P_0$. The λ/4 plate 72A converts the linearly polarized light $P_0$ (beam MA) into right circularly polarized light PR, and the λ/4 plate 72B converts the linearly polarized light $P_0$ (beam MB) into left circularly polarized light $P_L$.

In addition, the support 12 including the photo-alignment film 14 is placed on the movable stage 75, and thus the movable stage 75 is a so-called X-Y stage that is movable in a plane direction.

The support 12 including the photo-alignment film 14 on which the alignment pattern is not yet formed, that is, including the dried coating film is disposed at an exposed portion, the two beams MA and MB intersect and interfere each other on the photo-alignment film 14, and the photo-alignment film 14 is irradiated with and exposed to the interference light.

Due to the interference at this time, the polarization state of light with which the photo-alignment film 14 is irradiated periodically changes according to interference fringes. As a result, in the photo-alignment film 14, an alignment pattern in which the alignment state periodically changes can be obtained. Hereinafter, the photo-alignment film having the alignment pattern will also be referred to as "patterned photo-alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the photo-alignment film 14 having the alignment pattern in which the alignment state periodically changes, as described below, the cholesteric liquid crystal layer having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned photo-alignment film has the alignment pattern for aligning the liquid crystal compound to have the liquid crystal alignment pattern in which the direction of the optical axis of the liquid crystal compound in the cholesteric liquid crystal layer formed on the patterned photo-alignment film changes while continuously rotating in at least one in-plane direction. In a case where an axis in the direction in which the liquid crystal compound is aligned is an alignment axis, it can be said that the patterned photo-alignment film has the alignment pattern in which the direction of the alignment axis changes while continuously rotating in at least one in-plane direction. The alignment axis of the patterned photo-alignment film can be detected by measuring absorption anisotropy. For example, in a case where the amount of light transmitted through the patterned photo-alignment film is measured by irradiating the patterned photo-alignment film with linearly polarized light while rotating the patterned photo-alignment film, it is observed that a direction in which the light amount is the maximum or the minimum gradually changes in the one in-plane direction.

Here, in the exposure step of the photo-alignment film, the alignment pattern in which the direction of the alignment axis changes while continuously rotating in at least one in-plane direction is formed in the region irradiated with interference light.

Figure 5:
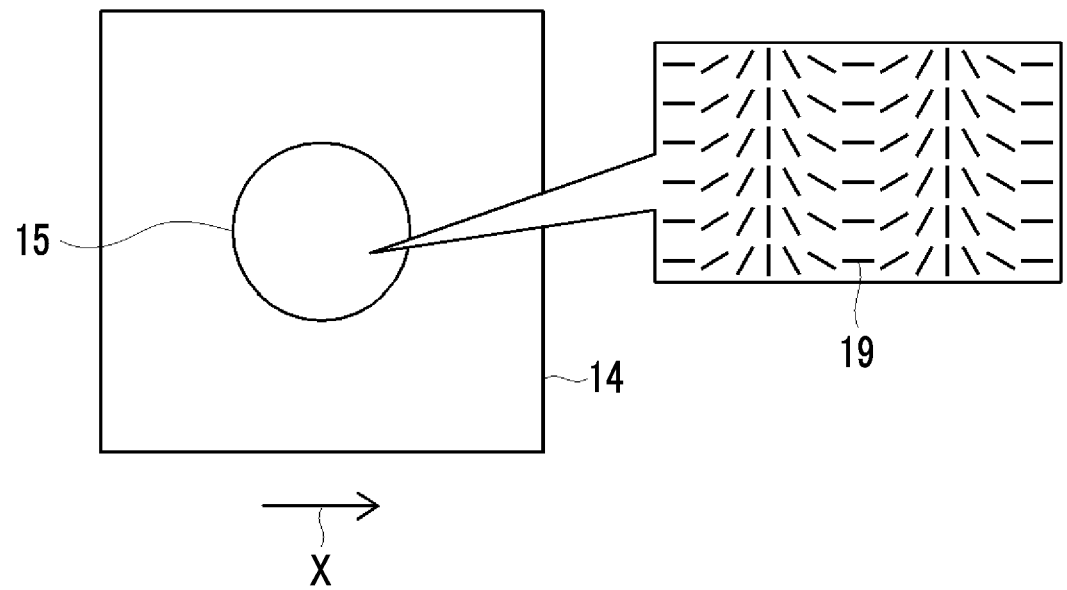
FIG. 5 is a plan view conceptually showing an example of a photo-alignment film that is exposed in the exposure step.

FIG. 5 is a plan view in a case where the photo-alignment film 14 exposed once is seen from the Z direction. In FIG. 5, a region indicated by reference numeral 15 is a region exposed to interference light (hereinafter, referred to as "exposed region"). This exposed region 15 substantially matches with the irradiation size of interference light that is formed by causing the two beams MA and MB to intersect with each other in the exposure device 60 shown in FIG. 4. The irradiation size is the size of interference light on the photo-alignment film.

In the above-described exposure step, typically, the exposure is performed for several minutes to several tens of minutes in a state where a relative position between the photo-alignment film and the irradiation position of the interference light is fixed. As a result, in the exposed region 15, as schematically shown in FIG. 5, an alignment pattern in which an alignment axis 19 changes while continuously rotating in at least one in-plane direction is formed.

Here, as described above, in a case where the alignment pattern is formed by the exposure of the interference light, the irradiation size of the interference light with which the photo-alignment film is irradiated is limited to a diameter of about 10 cm, and a photo-alignment film having a large size cannot be formed.

A method of expanding the irradiation size using a beam expander or the like can be adopted, but the irradiation energy per unit area decreases. Therefore, a high energy laser is required, and existing lasers have a limit on maximum output. In addition, the size of an optical system increases, which causes a problem in that the size of the device increases. Therefore, realistically, an increase in the size of the photo-alignment film using the method of expanding the irradiation size is limited to several centimeters.

Figure 6:
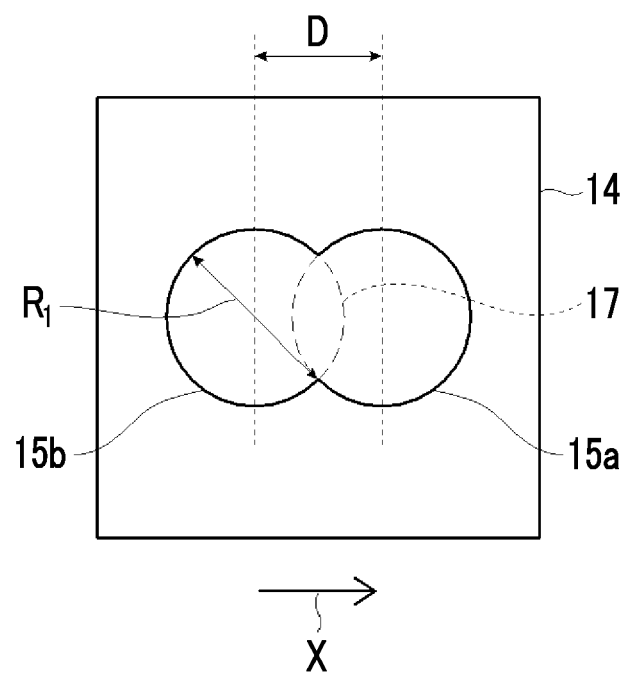
FIG. 6 is a schematic diagram showing a moving step in the method of forming a photo-alignment film according to the present invention.

Therefore, the present inventor investigated a method of expanding exposed regions in which the position of the support is moved using a movable stage to perform the second exposure after the exposure of the first exposure and the exposure is performed multiple times such that a first exposed region 15a and a second exposed region 15b partially overlap each other as shown in FIG. 6. However, it was found that, in a region (region indicated by reference numeral 17; hereinafter, also referred to as "overlapping region") where the exposure is repeated, a portion where the liquid crystal compound in the liquid crystal layer formed on the photo-alignment film is not appropriately aligned is present such that alignment defects occur. That is, it was found that in the overlapping region 17 of the photo-alignment film 14, the alignment pattern in which the direction of the alignment axis 19 changes while continuously rotating in at least one in-plane direction is not formed.

Regarding this point, the present inventors thought that, in a case where the direction of the alignment axis 19 at each position of the alignment pattern formed in the first exposure and the direction of the alignment axis 19 at each position of the alignment pattern formed in the second exposure are different in the overlapping region 17, the alignment axis 19 is not appropriately formed and the alignment pattern is not formed.

On the other hand, it was found that, in the present invention, after the first exposure, the moving step of moving the support 12 on which the photo-alignment film 14 is formed by a predetermined distance D in a direction parallel to the surface of the support 12 and parallel to a straight line formed by optical axes of two beams (the beams MA and MB) to perform the second exposure such that the alignment pattern in which the direction of the alignment axis 19 changes while continuously rotating in at least one in-plane direction can be formed even in the overlapping region 17.

Here, in a case where a wavelength of the two beams irradiated during the exposure is represented by $\lambda$, an intersecting angle between the two beams is represented by $\alpha$, and N represents an integer, the distance D is represented by the following expression.

$$\lambda/\{2\times\sin(\alpha/2)\}\times N - \lambda/8 < D < \lambda/\{2\times\sin(\alpha/2)\}\times N + \lambda/8$$

In the expression of the distance D, in a case where $\lambda/\{2\times\sin(\alpha/2)\}\times N$ is represented by $d_1$ and $\lambda/8$ is represented by $d_2$, the above-described expression is represented by $d_1-d_2<D<d_1+d_2$.

The component $\lambda/\{2\times\sin(\alpha/2)\}$ in $d_1$ corresponds to the single period $\Lambda$ of the alignment pattern formed in the exposed region 15. That is, d1 is a value of an integer multiple of the single period $\Lambda$. Accordingly, the distance D represented by $d_1-d_2<D<d_1+d_2$ represents that the support is moved by the distance of the value (the error range of $\pm d_2$) similar to the integer multiple of the single period $\Lambda$.

Here, in the exposed region 15, the direction (X direction) in which the direction of the alignment axis 19 changes while continuously rotating in the one in-plane direction is formed in the direction parallel to the straight line formed by the optical axes of the two beams (beams MA and MB) shown in FIG. 4. In other words, in case of being seen from a direction (Z direction) perpendicular to the surface of the photo-alignment film 14 (support 12) with which the interference light is irradiated, the direction is formed in the direction parallel to the optical axes of the two beams (beams MA and MB). The two beams MA and MB are irradiated in the direction parallel to the optical axes in case of being seen from the Z direction.

Accordingly, in a case where, after the first exposure, the support 12 is moved by the distance D (refer to FIG. 4) to perform the second exposure in the direction parallel to the surface of the support and parallel to the straight line formed by optical axes of the two beams, that is, in the one in-plane direction (X direction) in which the direction of the alignment axis 19 changes while continuously rotating in a plane, the support 12 is moved by the distance of substantially the integer multiple of the single period $\Lambda$. Therefore, the direction of the alignment axis 19 at each position of the alignment pattern formed in the first exposure and the direction of the alignment axis 19 at each position of the alignment pattern formed in the second exposure are different in the overlapping region 17 substantially match with each other, and the alignment axis 19 is appropriately formed. Therefore, even in the overlapping region 17, the alignment pattern can be appropriately formed. Accordingly, by alternately repeating the exposure step and the moving step, a photo-alignment film having a large size that can appropriately align a liquid crystal compound can be formed. In addition, by forming a liquid crystal layer on the photo-alignment film having a large size formed using the above-described forming method, a liquid crystal layer having a large size and small alignment defects can be formed.

In order to expand the exposed regions, the first exposed region 15a and the second exposed region 15b need to partially overlap each other. Accordingly, the distance D needs to be less than the irradiation size ($R_1$ in FIG. 6) of the interference light during the exposure.

Here, in the above description, the case where the exposure is performed two times is described. However, the present invention is not limited to this configuration, and the exposure may be performed three or more times.

Figure 7:
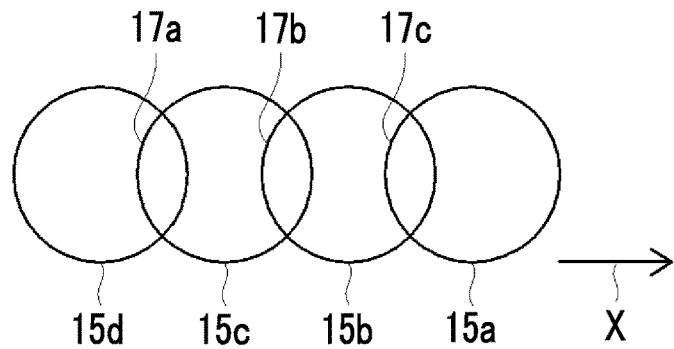
FIG. 7 is a schematic diagram showing another example of the photo-alignment film that is formed using the method of forming a photo-alignment film according to the present invention.

For example, as shown in FIG. 7, four exposed regions may be formed in the X direction by performing the exposure four times. In this case, a configuration may be adopted in which an exposed region 15a is formed by performing the first exposure, an exposed region 15b is performed by moving the support by the distance D in the X direction to perform the second exposure, an exposed region 15c is performed by moving the support by the distance D in the X direction to perform the third exposure, and an exposed region 15d is performed by moving the support by the distance D in the X direction to perform the fourth exposure. Since the support is moved by the distance D during each exposure, the alignment pattern can be appropriately formed in any of an overlapping region 17a where the exposed region 15a and the exposed region 15b overlap each other, an overlapping region 17b where the exposed region 15b and the exposed region 15c overlap each other, or an overlapping region 17c where the exposed region 15c and the exposed region 15d overlap each other.

In addition, in the example shown in FIG. 6, the exposed regions expand by performing the exposure multiple times while moving the support in the X direction. Further, the exposure may be performed multiple times while moving the support in a direction perpendicular to the X direction, that is, in a direction parallel to the surface of the support and perpendicular to the straight line formed by the optical axes of the two beams. The direction parallel to the surface of the support and perpendicular to the straight line formed by the optical axes of the two beams may match with the Y direction shown in FIG. 2.

As described above, in the Y direction, the direction of the alignment axis 19 is fixed. Accordingly, even in a case where the moving distance in the Y direction is any value, the directions of the alignment axes 19 at the respective positions in the overlapping region where two exposed regions overlap each other match with each other.

Figure 8:
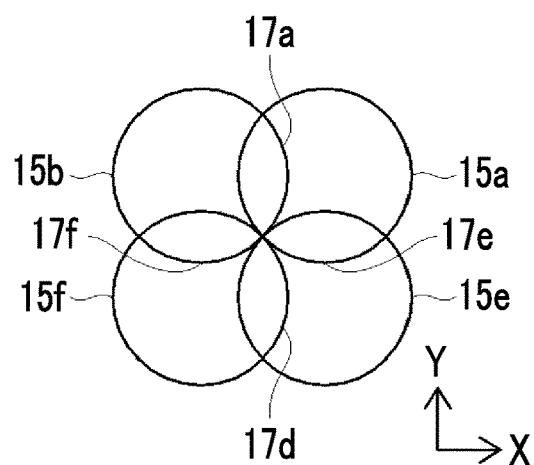
FIG. 8 is a schematic diagram showing another example of the photo-alignment film that is formed using the method of forming a photo-alignment film according to the present invention.

For example, in the example shown in FIG. 8, a configuration may be adopted in which the exposed region 15a is formed by performing the first exposure, the exposed region 15b is performed by moving the support by the distance D in the X direction to perform the second exposure, an exposed region 15f is performed by moving the support in the Y direction to perform the third exposure, and an exposed region 15e is formed by moving the support by a distance −D in the X direction to perform the fourth exposure.

Since the support is moved by the distance D during each exposure, the alignment pattern can be appropriately formed in any of the overlapping region 17a where the exposed region 15a and the exposed region 15b overlap each other or an overlapping region 17d where the exposed region 15e and the exposed region 15f overlap each other. In an overlapping region 17e where the exposed region 15a and the exposed region 15e overlap with each other and the overlapping region 17d where the exposed region 15b and the exposed region 15f overlap each other, the directions of the alignment axes 19 match with each other irrespective of the moving distance during each exposure. Therefore, the alignment pattern can be appropriately formed.

As shown in FIG. 8, by moving the support not in the X direction and the Y direction to perform the exposure multiple times such that the exposed regions expand, a photo-alignment film having any size and any shape can be formed.

In order to move the support in the Y direction, the exposed regions need to partially overlap each other. Therefore, the distance needs to be less than the irradiation size of the interference light during the exposure.

Here, the exposure time during the first exposure step varies depending on the output of light to be irradiated, the irradiation size, and the like but is preferably 3 minutes or longer, more preferably 4 minutes to 10 minutes, and still more preferably 5 minutes to 7 minutes.

In addition, the irradiation size of the interference light during the first exposure step varies depending on the output of light to be irradiated and the like but is preferably 50 mm or less, more preferably 5 mm to 40 mm, and still more preferably 8 mm to 15 mm.

In addition, the moving distance D during the moving step varies depending on the irradiation size and the like and is preferably 3 mm to 50 mm, more preferably 4 mm to 35 mm, and still more preferably 5 mm to 10 mm.

In addition, as described above, the exposure time in the single exposure step needs to be several minutes or longer. Therefore, unless the moving speed of the support in the moving step is very slow, even in a case where the support is moved after irradiating the photo-alignment film with the interference light, there is little effect on the alignment pattern formed on the photo-alignment film.

However, a configuration in which the irradiation of the photo-alignment film with the interference light is not performed during the moving step may be adopted.

For example, as shown in FIG. 4, in a configuration where light from one light source 64 is branched to form two beams and the two beams are caused to intersect with each other to form interference light, a configuration may be adopted in which a shutter that can shield output light (laser light M) from the light source 64 is provided, the shutter is closed to shield the output light after completion of the exposure step, the moving step is performed, the shutter is closed after completion of the moving step, and the next exposure step is performed. As described above, the present invention is not limited to the configuration in which the output light that is just output from the light source 64 is shielded, and each of the two beams branched from the output light may be shielded.

In addition, in the example shown in FIG. 6, the shape of one exposed region is a circular shape, that is, the irradiation shape of the interference light is a circular shape. However, the present invention is not limited to this example.

For example, a configuration may be adopted in which a mask is disposed on an optical path of light irradiated from the light source 64, the irradiation shape of the interference light with which the photo-alignment film 14 is irradiated is a quadrangular shape or the like, and the shape of the exposed region is a quadrangular shape or the like.

<Method of Forming Liquid Crystal Layer>

The method of forming a liquid crystal layer according to the embodiment of the present invention includes forming a liquid crystal layer on a photo-alignment film using a liquid crystal composition including a liquid crystal compound, the photo-alignment film being formed using the above-described method of forming a photo-alignment film.

The following description will be made using the cholesteric liquid crystal layer as an example. In the case of the optically-anisotropic layer shown in FIG. 9, the optically-anisotropic layer can be formed using basically the same method as described above, except that the liquid crystal composition does not include a chiral agent.

<<Method of Forming Cholesteric Liquid Crystal Layer>>

The cholesteric liquid crystal layer 16 can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 40 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Here, in the forming method according to the embodiment of the present invention, as described above, a photo-alignment film having a large size that can appropriately align a liquid crystal compound can be formed. Therefore, the liquid crystal compound in the liquid crystal layer formed on the photo-alignment film can be appropriately aligned, and a liquid crystal layer having small alignment defects can be formed.

A method of forming the cholesteric liquid crystal layer 16 is not limited, and various well-known forming methods can be used.

In particular, in the method of forming the cholesteric liquid crystal layer described below, the cholesteric liquid crystal layer 16 can be stably and suitably formed, which is preferable.

<<<Liquid Crystal Composition>>>

Examples of a material used for forming the cholesteric liquid crystal layer 16 obtained by immobilizing a cholesteric liquid crystalline phase include a liquid crystal composition including a liquid crystal compound and a chiral agent. It is preferable that the liquid crystal compound is a polymerizable liquid crystal compound.

In addition, the liquid crystal composition used for forming the cholesteric liquid crystal layer may further include a surfactant or the like.

——Polymerizable Liquid Crystal Compound——

The polymerizable liquid crystal compound may be a rod-like liquid crystal compound or a disk-like liquid crystal compound.

Examples of the rod-like polymerizable liquid crystal compound for forming the cholesteric liquid crystalline phase include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

——Disk-Like Liquid Crystal Compound——

As the disk-like liquid crystal compound, for example, compounds described in JP2007-108732A and JP2010-244038A can be preferably used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

——Surfactant——

The liquid crystal composition used for forming the cholesteric liquid crystal layer may include a surfactant.

It is preferable that the surfactant is a compound that can function as an alignment control agent contributing to the stable or rapid formation of a cholesteric liquid crystalline phase with planar alignment. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

The surfactants may be used alone or in combination of two or more kinds.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

(Alignment Control Agent)

In a case where the liquid crystal composition is applied to the photo-alignment film, it is preferable that at least one additive (alignment control agent) for providing the region having a pretilt angle is added to at least one of a photo-alignment film side or an air interface side. By adding the above-described additive to the composition, the region having a pretilt angle can be provided in the optical element.

In a case where the liquid crystal composition is applied to the photo-alignment film, it is preferable that an air interface alignment agent may be added in addition to the liquid crystal compound in order to provide a pretilt angle to the air interface side. As a result, the region having a pretilt angle can be formed in at least one of upper and lower interfaces of the optically-anisotropic layer. The air interface alignment agent is a composition including: a fluoropolymer (X) having a constitutional unit represented by Formula (A) described below; and a fluoropolymer (Y) having a polar group without having the constitutional unit represented by Formula (A) described below.

In the present invention, as described above, by mixing the fluoropolymer (X) and the fluoropolymer (Y) with the air interface alignment agent, thickness unevenness of the formed liquid crystal layer can be suppressed, and the pretilt angle can be controlled.

Although the details are not clear, it is presumed that, by inserting the rod-like liquid crystal compound between fluoropolymers (X) arranged at a regular interval, the pretilt angle of the liquid crystal layer after polymerization can be controlled to be in a low tilt range. In addition, it is presumed that the fluoropolymer (Y) holds the arrangement of the fluoropolymers (X) such that thickness unevenness of the formed liquid crystal layer can be suppressed.

It is preferable that the air interface alignment agent in the liquid crystal composition includes at least: a fluoropolymer (X) including a constitutional unit represented by Formula (A) described below; and a fluoropolymer (Y) having a polar group without having the constitutional unit represented by Formula (A) described below.

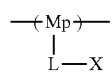
(A)

(In Formula (A), Mp represents a trivalent group forming a part of a polymer main chain, L represents a single bond or a divalent linking group, and X represents a substituted or unsubstituted fused ring functional group.)

<Mass Ratio Between Fluoropolymer (X) and Fluoropolymer (Y) (A:B)>

The mass ratio is preferably 98:2 to 2:98, more preferably 98:2 to 55:45, and still more preferably 98:2 to 60:40.

In the present invention, the content of the air interface alignment agent including the fluoropolymer (X) and the fluoropolymer (Y) is preferably 0.2 mass % to 10 mass %, more preferably 0.2 mass % to 5 mass %, and still more preferably 0.2 mass % to 3 mass % with respect to the total solid content of the liquid crystal composition.

[Other Components]

The liquid crystal composition may include components other than the liquid crystal compound and the photo-alignment compound.

For example, the liquid crystal composition may include a polymerization initiator.

As the polymerization initiator, for example, a thermal polymerization initiator or a photopolymerization initiator can be used depending on the type of the polymerization reaction. Examples of the photopolymerization initiator include an α-carbonyl compound, acyloin ether, an α-hydrocarbon-substituted aromatic acyloin compound, a polynuclear quinone compound, a combination of a triarylimidazole dimer and p-aminophenyl ketone, acridine, a phenazine compound, and an oxadiazole compound.

The amount of the polymerization initiator used is preferably 0.01 to 20 mass % and more preferably 0.5 to 5 mass % with respect to the total solid content of the composition.

In addition from the viewpoints of the uniformity of the coating film and the strength of the film, the liquid crystal composition may include a polymerizable monomer.

Examples of the polymerizable monomer include a radically polymerizable compound or a cationically polymerizable compound. The polymerizable monomer is preferably a polyfunctional radically polymerizable monomer and is preferably copolymerizable with the disk-like liquid crystal compound having the polymerizable group. For example, compounds described in paragraphs "0018" to "0020" in JP2002-296423A can be used.

The addition amount of the polymerizable monomer is preferably 1 to 50 parts by mass and more preferably 5 to 30 parts by mass with respect to 100 parts by mass of the liquid crystal compound.

In addition from the viewpoints of the uniformity of the coating film and the strength of the film, the liquid crystal composition may include a surfactant.

Examples of the surfactant include a well-known compound of the related art. In particular, a fluorine compound is preferable. Specific examples of the surfactant include a compound described in paragraphs "0028" to "0056" of JP2001-330725A and a compound described in paragraphs "0069" to "0126" of JP2003-295212A.

In addition, the liquid crystal composition may include a solvent and preferably an organic solvent.

Examples of the organic solvent include amides (for example, N,N-dimethylformamide), sulfoxides (for example, dimethyl sulfoxide), heterocyclic compounds (for example, pyridine), hydrocarbons (for example, benzene, or hexane), alkyl halides (for example, chloroform or dichloromethane), esters (for example, methyl acetate, ethyl acetate, or butyl acetate), ketones (for example, acetone or methyl ethyl ketone), and ethers (for example, tetrahydrofuran or 1,2-dimethoxyethane). Alkyl halide or ketone is preferable. Two or more organic solvents may be used in combination.

<<Onium Salt>>

In a case where the liquid crystal composition is applied to the photo-alignment film, the composition includes at least one onium salt in order to provide the region having a pretilt angle on the photo-alignment film side. The onium salt contributes to providing a constant pretilt angle to molecules of the rod-like liquid crystal compound on the photo-alignment film interface side. Examples of the onium salt include an onium salt such as an ammonium salt, a sulfonium salt, or a phosphonium salt. A quaternary onium salt is preferable, and a quaternary ammonium salt is more preferable.

The preferable content of the onium salt in the liquid crystal composition varies depending on the kind thereof, and typically is preferably 0.01 to 10 mass %, more preferably 0.05 to 7 mass %, and still more preferably 0.05 to 5 mass % with respect to the content of the rod-like liquid crystal compound used in combination. Two or more onium salts may be used. In this case, it is preferable that the total content of all the onium salts to be used is in the above-described range.

——Chiral Agent (Optically Active Compound)——

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), or an isomannide derivative can be used.

In addition, the chiral agent in which back isomerization, dimerization, isomerization, dimerization or the like occurs due to light irradiation such that the helical twisting power (HTP) decreases can also be suitably used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable.

As the photoisomerization group, an isomerization portion of a photochromic compound, an azo group, an azoxy group, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01 to 200 mol % and more preferably 1 to 30 mol % with respect to the content molar amount of the liquid crystal compound.

——Polymerization Initiator——

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which can initiate a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

——Crosslinking Agent——

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl) propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

——Other Additives——

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer (cholesteric liquid crystal layer 16) is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. These organic solvents may be used alone or in combination of two or more kinds. Among these, a ketone is preferable in consideration of an environmental burden.

<<<Formation of Cholesteric Liquid Crystal Layer>>>

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, the above-described liquid crystal composition including the liquid crystal compound and the chiral agent is applied to the photo-alignment film 14 having an alignment pattern corresponding to the above-described liquid crystal alignment pattern in which the direction of the optical axis 40A rotates in at least one in-plane direction.

For the application of the liquid crystal composition, a printing method such as ink jet or scroll printing or a well-known method such as spin coating, bar coating, or spray coating capable of uniformly applying liquid to a sheet-shaped material can be used.

The thickness of the coating film of the liquid crystal composition is not particularly limited and may be appropriately set depending on the thickness of the formed cholesteric liquid crystal layer 16.

Here, in the following method, a cholesteric liquid crystal layer having a large film thickness can be formed by performing the application once. In consideration of this point, it is preferable that the thickness de of the coating film of the liquid crystal composition exceeds half of the single period $\Lambda$ of the liquid crystal alignment pattern. That is, it is preferable that the thickness dc of the coating film of the liquid crystal composition satisfies "dc>$\Lambda$/2".

After the coating film of the liquid crystal composition is formed, a heating step of heating the liquid crystal composition is performed. Through the heating treatment, the liquid crystal compound 40 is aligned as described above.

It is preferable that the heating treatment is performed at a temperature Tl in a temperature range of a crystal-nematic phase transition temperature (Cr—Ne phase transition temperature) to a nematic-isotropic phase transition temperature (Ne-Iso phase transition temperature) of the liquid crystal compound 40.

In a case where the heating treatment temperature is lower than the Cr—Ne phase transition temperature, there may be a problem in that, for example, the liquid crystal compound 40 cannot be appropriately aligned.

In a case where the heating treatment temperature is higher than the Ne-Iso phase transition temperature, there may be a problem such as an increase in alignment defects or a decrease in diffraction efficiency.

The heating treatment time is not particularly limited and is preferably 10 to 600 seconds, more preferably 15 to 300 seconds, and still more preferably 30 to 200 seconds.

After completion of the heating step, it is preferable to cure the composition layer.

A curing method is not particularly limited, and examples thereof include a photocuring treatment and a thermal curing treatment. In particular, a light irradiation treatment is preferable, and an ultraviolet irradiation treatment is more preferable. In a case where the disk-like liquid crystal compound has a polymerizable group, it is preferable that the curing treatment is a polymerization reaction by light irradiation (in particular, ultraviolet irradiation), and it is more preferable that the curing treatment is a radical polymerization reaction by light irradiation (in particular, ultraviolet irradiation).

For the ultraviolet irradiation, a light source such as an ultraviolet lamp is used.

The irradiation energy dose of ultraviolet light is not particularly limited and, in general, is preferably about 100 to 800 mJ/cm$^2$. The time of ultraviolet irradiation is not particularly limited and may be appropriately determined from the viewpoint of obtaining both sufficient strength and productivity of the obtained layer.

In the curing by light irradiation, the exposure may be performed once. However, it is preferable that a first exposure step is performed after the heating treatment, and subsequently a second exposure step of emitting light having a wavelength different from that of the first exposure step is performed.

By performing the two-step exposure using the chiral agent in which the HTP decreases due to light irradiation, one helical pitch (pitch P) is extended in the first exposure step, and the liquid crystal composition is cured in the second exposure step. As a result, the cholesteric liquid crystal layer 16 having one helical pitch exceeding "P/$\Lambda$≤1.5" can be formed, and even in the cholesteric liquid crystal layer 16 having one helical pitch exceeding "P/$\Lambda$≤1.5", the liquid crystal compound 40 can be stably tilted with respect to the main surface in the upper region, that is, in the region spaced from the photo-alignment film 14.

By performing the exposure step twice, the cholesteric liquid crystal layer 16 can be controlled to have a configuration where, in a cross-section observed with a SEM, a region where the formation period of the bright portions and the dark portions, that is, the pitch P varies depending on positions in the thickness direction is provided.

In addition, by performing the exposure step twice, the cholesteric liquid crystal layer 16 can be controlled to have a configuration where, in a cross-section observed with a SEM, a region where the tilt angle $\theta 1$ varies depending on positions in the thickness direction is provided. The tilt angle $\theta 1$ refers to an angle of the bright portions and the dark portions with respect to the main surface of the cholesteric liquid crystal layer 16 as shown in FIG. 3.

It is preferable that the cholesteric liquid crystal layer 16 has a region where the tilt angle $\theta 1$ continuously increases in one thickness direction. In the example shown in the drawing, it is preferable that the cholesteric liquid crystal layer 16 has a region where the tilt angle $\theta 1$ continuously increases from the photo-alignment film 14 side to the side (air side interface A) away from the photo-alignment film 14.

It is more preferable that the cholesteric liquid crystal layer 16 has a region where the tilt angle θ1 continuously increases in one thickness direction and a region where the tilt angle θ1 continuously decreases in the one thickness direction. In the example shown in the drawing, it is more preferable that the cholesteric liquid crystal layer 16 has a region where the tilt angle θ1 continuously increases from the photo-alignment film 14 side to the side away from the photo-alignment film 14 and a region where the tilt angle θ1 continuously decreases from the photo-alignment film 14 side to the side away from the photo-alignment film 14. In particular, it is preferable that the cholesteric liquid crystal layer 16 has a region that is closest to the photo-alignment film 14 side in the thickness direction and where the increase of the tilt angle θ1 is the smallest, an intermediate region where the increase of the tilt angle θ1 is large, and a region that is the farthest from the photo-alignment film 14 and where the tilt angle θ1 continuously decreases with respect to the intermediate region.

In the cholesteric liquid crystal layer 16 having the structure in which the pitch P and/or the tilt angle θ continuously changes in the thickness direction, the performance in which the incidence angle dependence of the transmittance is wide can be obtained. An angle range where the transmittance decreases corresponds to an angle range where incidence light is diffracted. Accordingly, by using the diffraction element in which the incidence angle dependence of the transmittance is wide, for example, for an element for incidence or emission of a light guide plate of AR glasses, AR glasses having a wide viewing angle can be obtained.

The light used for the exposure is not particularly limited, and it is preferable to use ultraviolet light. The wavelength of irradiated ultraviolet light is preferably 250 to 430 nm.

The total irradiation energy is preferably 2 mJ/cm$^2$ to 50 J/cm$^2$ and more preferably 5 to 1500 mJ/cm$^2$. In order to promote a photopolymerization reaction, the exposure may be performed under heating conditions or in a nitrogen atmosphere.

The thickness of the cholesteric liquid crystal layer 16 formed using the forming method according to the embodiment of the present invention is not particularly limited and may be appropriately set depending on the selective reflection center wavelength of the cholesteric liquid crystal layer 16, the reflectivity (diffraction efficiency) required for the cholesteric liquid crystal layer 16, and the like.

The film thickness of the cholesteric liquid crystal layer 16 formed using the forming method according to the embodiment of the present invention is preferably 1.0 μm or more and more preferably 2.0 μm or more. The upper limit of the thickness of the cholesteric liquid crystal layer 16 formed using the forming method according to the embodiment of the present invention is about 6 μm.

The forming method according to the embodiment of the present invention is suitably applicable to the formation of the cholesteric liquid crystal layer using the multiple coating of repeating the formation of the cholesteric liquid crystal layer.

The optical element prepared using the forming method according to the embodiment of the present invention may consist of only the liquid crystal layer (the cholesteric liquid crystal layer 16 or the optically-anisotropic layer 18) or may include the photo-alignment film and the support.

In addition, the optical element prepared using the above-described forming method according to the embodiment of the present invention may consist of only the liquid crystal layer (the cholesteric liquid crystal layer 16 or the optically-anisotropic layer 18). However, the present invention is not limited to this configuration. That is, the optical element may include two or more liquid crystal layers.

For example, the optical element prepared using the forming method according to the embodiment of the present invention may include two cholesteric liquid crystal layers including a cholesteric liquid crystal layer that selectively reflects red light and a cholesteric liquid crystal layer that selectively reflects green light, and may include three cholesteric liquid crystal layers including a cholesteric liquid crystal layer that selectively reflects red light, a cholesteric liquid crystal layer that selectively reflects green light, and a cholesteric liquid crystal layer that selectively reflects blue light.

In a case where the optical element includes a plurality of cholesteric liquid crystal layers, it is preferable that all the cholesteric liquid crystal layers are the cholesteric liquid crystal layers 16 prepared using the forming method according to the embodiment of the present invention, and a typical cholesteric liquid crystal layer prepared using a method in the related art may be included.

The optical element prepared using the forming method according to the embodiment of the present invention can be used for various uses where light is reflected at an angle other than the angle of specular reflection, for example, an optical path changing member, a light collecting element, a light diffusing element to a predetermined direction, a diffraction element, or the like in an optical device.

Hereinabove, the method of forming a photo-alignment film and the method of forming a liquid crystal layer according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

(Formation of Photo-Alignment Film)

A glass substrate was used as the support.

The following coating liquid for forming a photo-alignment film was applied to the support using a spin coater at 2500 rpm for 30 seconds (application step). The support on which the coating film of the coating liquid for forming a photo-alignment film was formed was dried using a hot plate at 60° C. for 60 seconds (drying step). As a result, a photo-alignment film was formed.

| Coating Liquid for Forming Photo-Alignment Film | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment

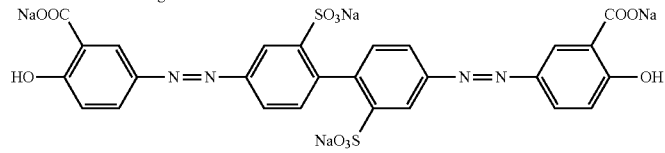

(Exposure of Photo-Alignment Film (Exposure Step))

The photo-alignment film was exposed using the exposure device shown in FIG. 4 to form a photo-alignment film P-1 having an alignment pattern.

Specifically, as a sample stage (movable stage) used in the exposure device, FA95e-50XY-50Z (high-accuracy PLUS specification, manufactured by Aerotech) was used. As the laser, a laser that emits laser light having a wavelength (325 nm) was used. The exposure dose of the interference light during each exposure was 3000 mJ/cm². An intersecting angle (intersecting angle α) between the two beams was adjusted to 39.8° such that the single period Λ (the length over which the optical axis rotates by 180°) of an alignment pattern formed by interference of two laser beams was 0.477 μm. In this case, the irradiation size (diameter) of the interference light on the photo-alignment film was 10 mm.

The support on which the photo-alignment film was formed was set in the sample stage, and the first exposure was performed under the above-described conditions. Next, the sample stage was moved at a rate of 100 mm/sec by the distance D=8,115,940 nm in the direction parallel to the surface (main surface) of the support and parallel to the straight line formed by optical axes of two beams intersecting each other, that is, in the X direction to perform the second exposure under the same conditions as described above.

In a case where the distance D is represented by $d_1=\lambda/\{2\times\sin(\alpha/2)\}\times N+d_2$, $\lambda/\{2\times\sin(\alpha/2)\}=477.4$ nm based on $\lambda=325$ nm and $\alpha=39.8°$, N=17000, $d_1=8115940$ nm, and $d_2=0$ nm. Accordingly, $d_2$ is within $\pm\lambda/8$ (=41 nm).

(Formation of Cholesteric Liquid Crystal Layer (Liquid Crystal Layer Forming Step))

As the liquid crystal composition forming the cholesteric liquid crystal layer, the following liquid crystal composition LC-1 was prepared.

| Liquid Crystal Composition LC-1 | |
|---|---|
| Liquid crystal compound L-1 | 100.00 parts by mass |
| Polymerization initiator (IRGACURE 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 6.20 parts by mass |
| Methy lethyl ketone | 330.60 parts by mass |

Liquid Crystal Compound L-1

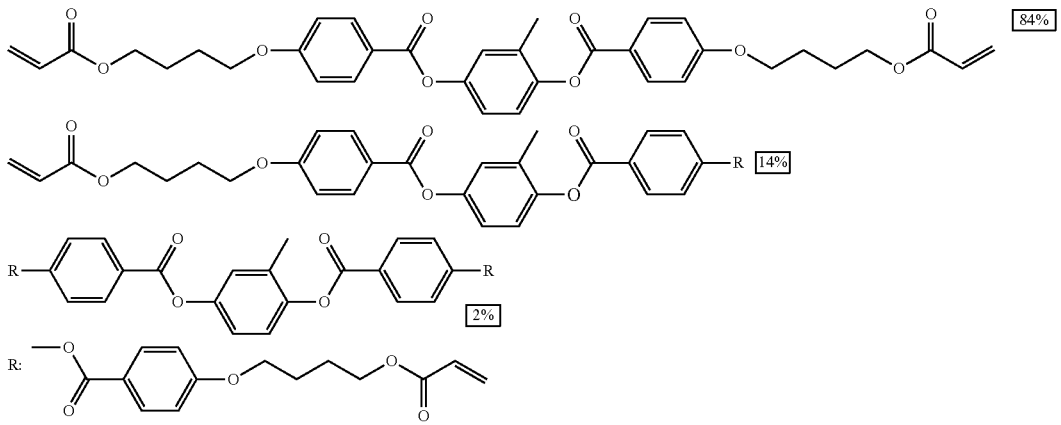

The phase transition temperature of the liquid crystal compound L-1 was obtained by heating the liquid crystal compound on a hot stage and observing the texture with a polarization microscope. As a result, the crystal-nematic phase transition temperature was 79° C., and the nematic-isotropic phase transition temperature was 144° C.

In addition, Δn of the liquid crystal compound L-1 was measured by pouring the liquid crystal compound into a wedge cell, emitting laser light having a wavelength of 550 nm, and measuring the refraction angle of the transmitted light. The measurement temperature was 60° C. Δn of the liquid crystal compound L-1 was 0.16.

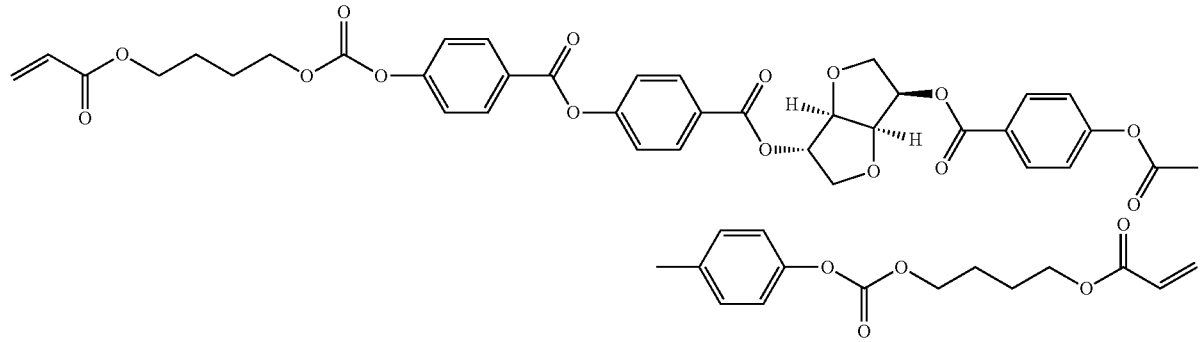

Chiral Agent Ch-1

This chiral agent Ch-1 is a chiral agent that turns the liquid crystal compound in a right-twisted helical shape. Accordingly, the cholesteric liquid crystal layer selectively reflects right circularly polarized light.

The above-described liquid crystal composition LC-1 was applied to the photo-alignment film P-1 using a spin coater at 800 rpm for 10 seconds (application step).

The coating film of the liquid crystal composition LC-1 was heated on a hot plate at 80° C. for 3 minutes (180 sec) (heating step).

Next, the coating film was irradiated with ultraviolet light having a wavelength of 365 nm at 80° C. at an irradiation dose of 300 mJ/cm² using a high-pressure mercury lamp in a nitrogen atmosphere. As a result, the liquid crystal composition LC-1 was cured, the alignment of the liquid crystal compound was immobilized, and a cholesteric liquid crystal layer was formed.

Thus, an optical element including the support, the photo-alignment film, and the cholesteric liquid crystal layer was prepared.

It was verified using a polarization microscope that the cholesteric liquid crystal layer had a periodically aligned surface as shown in FIG. 2.

The optical element was cut in a direction along the rotation direction of the optical axis, and a cross-section was observed with a SEM. In a case where the single period Λ of the liquid crystal alignment pattern and the length P of one helical pitch were measured by analyzing the SEM image, the period Λ was 477 nm, and the pitch P was 410 nm.

Example 2

An optical element was prepared using the same method as that of Example 1, except that the moving distance of the sample stage after the first irradiation during the exposure to the photo-alignment film was changed to 8,115,975 nm.

In a case where the distance D is represented by $d_1=\lambda/\{2\times\sin(\alpha/2)\}\times N+d_2$, $N=17000$, $d_1=8115940$ nm, and $d_2=35$ nm. Accordingly, $d_2$ is within $\pm\lambda/8$ (=41 nm).

Example 3

An optical element was prepared using the same method as that of Example 1, except that the moving distance of the sample stage after the first irradiation during the exposure to the photo-alignment film was changed to 8,115,905 nm.

In a case where the distance D is represented by $d_1=\lambda/\{2\times\sin(\alpha/2)\}\times N+d_2$, $N=17000$, $d_1=8115940$ nm, and $d_2=-35$ nm. Accordingly, $d_2$ is within $\pm\lambda/8$ (=41 nm).

Comparative Example 1

An optical element was prepared using the same method as that of Example 1, except that the moving distance of the sample stage after the first irradiation during the exposure to the photo-alignment film was changed to 8,116,090 nm.

In a case where the distance D is represented by $d_1=\lambda/\{2\times\sin(\alpha/2)\}\times N+d_2$, $N=17000$, $d_1=8115940$ nm, and $d_2=150$ nm. Accordingly, $d_2$ is within a range of $\pm\lambda/8$ (=41 nm).

Comparative Example 2

An optical element was prepared using the same method as that of Example 1, except that the moving distance of the sample stage after the first irradiation during the exposure to the photo-alignment film was changed to 8,115,790 nm.

In a case where the distance D is represented by $d_1=\lambda/\{2\times\sin(\alpha/2)\}\times N+d_2$, $N=17000$, $d_1=8115940$ nm, and $d_2=-150$ nm. Accordingly, $d_2$ is within a range of $\pm\lambda/8$ (=41 nm).

Comparative Example 3

An optical element was prepared using the same method as that of Example 1, except that the moving distance of the sample stage after the first irradiation during the exposure to the photo-alignment film was changed to 11,935,206 nm.

Since the distance D is more than the irradiation size (10 mm), the first irradiation range and the second irradiation range are spaced from each other without overlapping each other.

[Evaluation]

The sample was evaluated based on the following standards to evaluate whether or not a large sample was formed by visual inspection.

A: the liquid crystal layer in a region whether the first and second exposures overlapped each other was also clearly aligned such that one large liquid crystal layer was formed.

B: the liquid crystal layer in a region whether the first and second exposures overlapped each other was not aligned such that one large diffraction grating was not formed.

C: there was a gap between the first and second exposed regions such that one large diffraction grating was not formed.

The results are shown in Table 1.

TABLE 1

|  | Example 1 | Example 2 | Example 3 | Comparative Example 1 | Comparative Example 2 | Comparative Example 3 |
|---|---|---|---|---|---|---|
| Wavelength $\lambda$ nm | 325 | 325 | 325 | 325 | 325 | 325 |
| $\lambda/8$ | 41 | 41 | 41 | 41 | 41 | 41 |
| Intersecting Angle $\alpha°$ | 39.8 | 39.8 | 39.8 | 39.8 | 39.8 | 39.8 |
| Irradiation Size nm | 10,000,000 | 10,000,000 | 10,000,000 | 10,000,000 | 10,000,000 | 10,000,000 |
| N | 17000 | 17000 | 17000 | 17000 | 17000 | 25000 |
| d1 | 8,115,940 | 8,115,940 | 8,115,940 | 8,115,940 | 8,115,940 | 11,935,206 |
| d2 | 0 | 35 | −35 | 150 | −150 | 0 |
| Distance D | 8,115,940 | 8,115,975 | 8,115,905 | 8,116,090 | 8,115,790 | 11,935,206 |
| Evaluation Result | A | A | A | B | B | C |

It can be seen from Table 1, in Examples of the present invention, as compared to Comparative Examples, the liquid crystal layer in a region whether the exposures overlapped each other was also more clearly aligned such that the liquid crystal compound having a large size can be appropriately aligned. In addition, it can be seen that a liquid crystal layer having a large size and small alignment defects can be formed.

As can be seen from the above results, the effects of the present invention are obvious.

The present invention is suitably applicable to various uses where light is diffracted in an optical device, for example, a diffraction element that causes light to be incident into a light guide plate of AR glasses or emits light to the light guide plate.

EXPLANATION OF REFERENCES 10, 10b: optical element
12: support
14: photo-alignment film
15, 15a to 15f: exposed region
16: cholesteric liquid crystal layer
17, 17a to 17d: overlapping region
18: optically-anisotropic layer
19: alignment axis
40: liquid crystal compound
40A: optical axis
60: exposure device
62: laser
64: light source
65: $\lambda/2$ plate
68: polarization beam splitter
70a, 70B: mirror
72A, 72B: $\lambda/4$ plate
75: movable stage
R: right circularly polarized light
M: laser light
MA, MB: beam
$P_O$: linearly polarized light
PR: right circularly polarized light
$P_L$: left circularly polarized light
P: helical pitch
A: single period of liquid crystal alignment pattern

What is claimed is:

1. A method of forming a photo-alignment film, the method comprising:
   an exposure step of irradiating a surface of a photo-alignment film including a photo-alignment material that is formed on a support with interference light formed by intersection of two beams such that the surface of the photo-alignment film is exposed to form, on the photo-alignment film, an alignment pattern in which a direction of an optical axis derived from a liquid crystal compound changes while continuously rotating in at least one in-plane direction; and
   a moving step of moving the support by a distance D in a direction parallel to the surface of the support and parallel to a straight line formed by optical axes of the two beams,
   wherein the photo-alignment film is exposed by alternately repeating the exposure step and the moving step, and
   in a case where a wavelength of the two beams is represented by $\lambda$, an intersecting angle between the two beams is represented by a, and N represents an integer, the distance D is represented by the following expression and is less than an irradiation size of the interference light with which the photo-alignment film is irradiated, $\lambda/\{2\times\sin(\alpha/2)\}\times N-\lambda/8 < D < \lambda/\{2\times\sin(\alpha/2)\}\times N+\lambda/8.$ 2. The method of forming a photo-alignment film according to claim 1,
   wherein the two beams are branched from output light from one light source, and
   in the moving step, the output light is shielded by a shutter that shields the output light.

3. The method of forming a photo-alignment film according to claim 2,
   wherein an irradiation shape of the interference light is formed by a mask.

4. The method of forming a photo-alignment film according to claim 2,
   wherein in the single exposure step, the irradiation of the photo-alignment film with the interference light is performed for 3 minutes or longer.

5. The method of forming a photo-alignment film according to claim 2,
   wherein in the exposure step, the irradiation size of the interference light with which the photo-alignment film is irradiated is 50 mm or less.

6. The method of forming a photo-alignment film according to claim 2,
   wherein the distance D in the moving step is 5 mm to 50 mm.

7. The method of forming a photo-alignment film according to claim 2, further comprising:
   a step of moving the support in a direction parallel to a surface of the support and perpendicular to the straight line formed by optical axes of the two beams to expose the surface of the photo-alignment film.

8. A method of forming a liquid crystal layer comprising:
forming a liquid crystal layer on a photo-alignment film using a liquid crystal composition including a liquid crystal compound, the photo-alignment film being formed using the method of forming a photo-alignment film according to claim 2.

9. The method of forming a photo-alignment film according to claim 1,
wherein an irradiation shape of the interference light is formed by a mask.

10. The method of forming a photo-alignment film according to claim 9,
wherein in the single exposure step, the irradiation of the photo-alignment film with the interference light is performed for 3 minutes or longer.

11. The method of forming a photo-alignment film according to claim 9,
wherein in the exposure step, the irradiation size of the interference light with which the photo-alignment film is irradiated is 50 mm or less.

12. The method of forming a photo-alignment film according to claim 9,
wherein the distance D in the moving step is 5 mm to 50 mm.

13. The method of forming a photo-alignment film according to claim 9, further comprising:
a step of moving the support in a direction parallel to a surface of the support and perpendicular to the straight line formed by optical axes of the two beams to expose the surface of the photo-alignment film.

14. A method of forming a liquid crystal layer comprising:
forming a liquid crystal layer on a photo-alignment film using a liquid crystal composition including a liquid crystal compound, the photo-alignment film being formed using the method of forming a photo-alignment film according to claim 9.

15. The method of forming a photo-alignment film according to claim 1,
wherein in the single exposure step, the irradiation of the photo-alignment film with the interference light is performed for 3 minutes or longer.

16. The method of forming a photo-alignment film according to claim 15,
wherein in the exposure step, the irradiation size of the interference light with which the photo-alignment film is irradiated is 50 mm or less.

17. The method of forming a photo-alignment film according to claim 1,
wherein in the exposure step, the irradiation size of the interference light with which the photo-alignment film is irradiated is 50 mm or less.

18. The method of forming a photo-alignment film according to claim 1,
wherein the distance D in the moving step is 5 mm to 50 mm.

19. The method of forming a photo-alignment film according to claim 1, further comprising:
a step of moving the support in a direction parallel to a surface of the support and perpendicular to the straight line formed by optical axes of the two beams to expose the surface of the photo-alignment film.

20. A method of forming a liquid crystal layer comprising:
forming a liquid crystal layer on a photo-alignment film using a liquid crystal composition including a liquid crystal compound, the photo-alignment film being formed using the method of forming a photo-alignment film according to claim 1.

* * * * *